United States Patent
Wolfe et al.

(10) Patent No.: US 11,416,840 B1
(45) Date of Patent: Aug. 16, 2022

(54) COMPUTER-BASED SYSTEMS UTILIZING CARDS WITH CELLULAR CAPABILITIES AND METHODS OF USE THEREOF

(71) Applicant: American Express Travel Related Services Company, Inc., New York, NY (US)

(72) Inventors: Russell Wolfe, Phoenix, AZ (US); James Bruce Coleman, Phoenix, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 203 days.

(21) Appl. No.: 16/731,975

(22) Filed: Dec. 31, 2019

(51) Int. Cl.
| | |
|---|---|
| *G06Q 20/32* | (2012.01) |
| *G06K 19/07* | (2006.01) |
| *G06K 19/077* | (2006.01) |
| *H04W 76/10* | (2018.01) |
| *H04W 8/20* | (2009.01) |
| *G06Q 20/36* | (2012.01) |
| *G01S 19/42* | (2010.01) |

(52) U.S. Cl.
CPC ....... *G06Q 20/325* (2013.01); *G06K 19/0707* (2013.01); *G06K 19/07773* (2013.01); *G06Q 20/367* (2013.01); *H04W 8/20* (2013.01); *H04W 76/10* (2018.02); *G01S 19/42* (2013.01)

(58) Field of Classification Search
CPC ......... G06K 19/0707; G06K 19/07773; G06K 19/07; G06K 19/071; G06Q 20/235; G06Q 20/367; G06Q 20/325; G06Q 20/352; G06Q 20/32; H04W 76/10; H04W 8/20; G01S 19/42
See application file for complete search history.

(56) References Cited

U.S. PATENT DOCUMENTS

| | | | | |
|---|---|---|---|---|
| 5,943,624 | A * | 8/1999 | Fox | G06K 19/0723 455/406 |
| 7,278,584 | B1 * | 10/2007 | Gandel | B42D 25/369 428/126 |
| 7,908,220 | B1 * | 3/2011 | Attieh | G06Q 20/14 705/64 |
| 8,201,747 | B2 | 6/2012 | Brown et al. | |
| 9,373,069 | B2 | 6/2016 | Cloutier et al. | |
| 10,839,371 | B1 * | 11/2020 | Vukich | G06Q 20/3224 |
| 11,144,916 | B2 * | 10/2021 | Kobres | G06Q 20/12 |
| 2004/0129787 | A1 * | 7/2004 | Saito | G06F 21/34 235/492 |
| 2004/0255081 | A1 * | 12/2004 | Arnouse | G07C 9/23 711/115 |
| 2008/0314971 | A1 * | 12/2008 | Faith | G06Q 20/322 235/379 |

(Continued)

*Primary Examiner* — Daniel I Walsh
(74) *Attorney, Agent, or Firm* — Sterne, Kessler, Goldstein & Fox P.L.L.C.

(57) ABSTRACT

In various some embodiments a cellular card includes at least one microprocessor. The cellular card is equipped with multiple devices and configured with multiple functionalities to deter use of the cellular card in unsecure or fraudulent transactions. In various embodiments, the cellular card overcomes drawbacks often associated with cards containing batteries such as battery overheating, battery short life time, battery underperformance in extreme temperatures, and other types of drawbacks associated with batteries contained in cards.

20 Claims, 26 Drawing Sheets

(56) References Cited

U.S. PATENT DOCUMENTS

| | | | |
|---|---|---|---|
| 2009/0127332 A1* | 5/2009 | Park | G06Q 20/40 235/380 |
| 2009/0159709 A1 | 6/2009 | Mullen | |
| 2010/0065626 A1* | 3/2010 | Hammad | G06K 7/006 235/380 |
| 2011/0035290 A1* | 2/2011 | Mortillaro | G06Q 30/0601 705/26.1 |
| 2011/0047038 A1* | 2/2011 | Halevi | G06Q 20/40 705/17 |
| 2013/0346223 A1* | 12/2013 | Prabhu | G06Q 20/20 705/17 |
| 2014/0114855 A1* | 4/2014 | Bajaj | G06Q 20/40 705/44 |
| 2014/0138435 A1* | 5/2014 | Khalid | G06Q 20/352 235/380 |
| 2014/0179304 A1* | 6/2014 | Bernath | H04W 12/08 455/422.1 |
| 2014/0279476 A1* | 9/2014 | Hua | G06Q 20/227 705/41 |
| 2014/0358777 A1* | 12/2014 | Gueh | G06Q 20/1085 705/43 |
| 2015/0115028 A1* | 4/2015 | Montealegre | G07B 15/04 235/382 |
| 2015/0294293 A1* | 10/2015 | Signarsson | G06Q 20/327 705/17 |
| 2016/0055583 A1* | 2/2016 | Liberty | G06Q 20/405 705/37 |
| 2016/0098708 A1* | 4/2016 | Loomis | G06Q 20/367 705/39 |
| 2016/0239733 A1* | 8/2016 | Hertz | G06F 16/9566 |
| 2016/0275760 A1* | 9/2016 | Block | G07F 19/203 |
| 2019/0286805 A1* | 9/2019 | Law | G06F 21/34 |
| 2020/0104550 A1* | 4/2020 | Russell-Clarke | G06K 19/083 |
| 2020/0286074 A1* | 9/2020 | Garrett | C07D 403/04 |
| 2020/0387765 A1* | 12/2020 | Meers | G06K 19/0716 |
| 2020/0394370 A1* | 12/2020 | Garrett | G06Q 20/349 |
| 2021/0406869 A1* | 12/2021 | Pathrabe | H04L 9/0877 |
| 2022/0067699 A1* | 3/2022 | Wong | G06Q 20/341 |

\* cited by examiner

COMPUTER-BASED SYSTEMS UTILIZING CARDS WITH CELLULAR CAPABILITIES AND METHODS OF USE THEREOF

BACKGROUND OF TECHNOLOGY

Smart cards can connect to computing devices with direct physical contact or with a remote contactless radio frequency interface. Smart cards can store data and transmit such data to computing devices. Some smart cards include static data that can be used to complete an interaction with a computing device. Such smart cards can be tampered with when a third-party uses the static data to complete interactions with computing devices unbeknown to a legitimate user of a smart card.

SUMMARY OF DESCRIBED SUBJECT MATTER

In some embodiments, the present disclosure provides a technically improved system comprising: a cellular card comprising: a processor; at least one antenna; a non-transient memory storing instructions which, when executed by the processor, cause the processor to: power up the cellular card upon receiving a power from an external power source housed within a computing device during at least one interaction between the cellular card and the computing device; where the card lacks an internal power source; and when the cellular card is powered up, the processor is further configured to: establish, via the antenna, a first wireless communication with at least one cellular network tower associated with a mobile network carrier during the at least one interaction between the card and the computing device; provide, with the first wireless communication, card identifying data to the mobile network carrier to register the cellular card with a user mobile account of a user who is associated with the cellular card so to transform the cellular card into a user-associated mobile card device; receive, from the mobile network carrier, user mobile account data that comprises a user-associated private key; transmit the user mobile data to a card issuing entity computing device of a card issuing entity that issued the cellular card to the user so as to associate the user mobile account with user card account of the user corresponding to the card based at least in part on the user-associated private key; and cause to share the user mobile account data of the user mobile account and user card account data of the user card account between the mobile network carrier and the card issuing entity.

In some embodiments, the present disclosure provides a technically improved method comprising: powering up a cellular card by applying a power from an external power source housed within a computing device during at least one interaction between the cellular card and the computing device; where the cellular card lacks an internal power source; where the cellular card comprises at least one antenna, a processor, and a non-transient memory; and when the cellular card is powered up: establishing, by the processor, via the antenna, a first wireless communication with at least one cellular network tower associated with a mobile network carrier during the at least one interaction between the cellular card and the computing device; providing, by the processor, with the first wireless communication, card identifying data to the mobile network carrier to register the cellular card with a user mobile account of a user who is associated with the cellular card so to transform the card into a user-associated mobile card device; receiving, by the processor, from the mobile network carrier, user mobile account data that comprises a user-associated private key; transmitting, by the processor, the user mobile data to a card issuing entity computing device of a card issuing entity that issued the card to the user so as to associate the user mobile account with user card account of the user corresponding to the cellular card based at least in part on the user-associated private key; and causing to share, by the processor, the user mobile account data of the user mobile account and user card account data of the user card account between the mobile network carrier and the card issuing entity.

In some embodiments, the present disclosure provides a technically improved computer-based apparatus that includes at least the following components of a computer-based dynamic cellular card. The dynamic cellular card can perform an interaction with a computing device using a first temporary identification card number. The dynamic cellular card is without an internal power source and is powered up by an external power source housed within the computing device. The dynamic cellular card can receive a new identification card number from a server in communication with the computing device. The dynamic cellular card can show the second temporary identification card number on a display, replacing the first temporary identification card number. The second temporary identification card number can remain shown on the display after the external power is discontinued. The dynamic cellular card can be used with the second temporary identification card number in a subsequent interaction with another computing device.

In some embodiments, the present disclosure provides a technically improved computer-based apparatus that includes at least the following computer-based dynamic cellular card. A dynamic cellular card comprising: a processor; a display; and a non-transitory memory storing instructions; where the dynamic cellular card is configured to power up upon receiving a power from an external power source housed within a computing device; where the dynamic cellular card is without an internal power source; where the instructions, when executed by the processor, cause the processor to: cause to transmit a first temporary card identification number associated with the dynamic cellular card to the computing device; receive at least one encrypted card identification number from at least one server in communication with the computing device when a condition is met; decrypt a second temporary card identification number from the at least one encrypted card identification number; and replace the first temporary card identification number shown on the display with the temporary card identification number, and where the temporary card identification number remains shown on the display after the power from the external power source is discontinued.

In some embodiments, the present disclosure provides a technically improved computer-based method comprising: powering up a dynamic cellular card, upon receiving a power from an external power source housed within a computing device; wherein the dynamic cellular card is without an internal power source; and where, when the dynamic cellular card is powered up: transmitting, by the processor, a first temporary card identification number associated with the dynamic cellular card to the computing device; receiving, by the processor, at least one encrypted card identification number from at least one server in communication with the computing device when a condition is met; decrypting, by the processor, temporary card identification number from the at least one encrypted card identification number; and replacing, by the processor, the first temporary card identification number shown on a display with the temporary card identification number, and where the second temporary card identification number remains shown on the display after the power from the external power source is discontinued.

In some embodiments, the present disclosure provides a technically improved computer-based article comprising: a non-transitory computer readable medium comprising code which, when executed by a processor, causes the processor to: power up a dynamic cellular card upon receiving a power from an external power source housed within a computing device; where the dynamic cellular card is without an internal power source; and where, when the dynamic cellular card is powered up, the instructions further cause the processor to: transmit a first temporary card identification number associated with the dynamic cellular card to the computing device; receive at least one encrypted card identification number from at least one server in communication with the computing device when a condition is met; decrypt a second temporary card identification number from the at least one encrypted card identification number; and replace the first temporary card identification number shown on a display with the second temporary card identification number, and where the second temporary card identification number remains shown on the display after the power from the external power source is discontinued.

In some embodiments, the present disclosure provides a technically improved computer-based apparatus that includes at least the following computer-based dynamic cellular card. A dynamic cellular card that can perform an interaction with a computing device using a first temporary identification card number, a first temporary primary account number, a first temporary expiration date, and a first temporary card security code. The dynamic cellular card is without an internal power source and is powered up by an external power source housed within the computing device. The dynamic cellular card can receive at least a new temporary identification card number, a new temporary primary account number, a new temporary expiration date, and a new temporary card security code from a server in communication with the computing device. The dynamic cellular card can show the new set of new temporary card numbers on a display, replacing the first set of temporary card numbers or some subset of those numbers with the new set of temporary card numbers. The second temporary card numbers can remain shown on the display after the external power is discontinued. The new temporary card numbers can be used in a subsequent interaction with another computing device.

In some embodiments, the present disclosure provides a technically improved computer-based apparatus that includes at least the following components of a computer-based fingerprint-enabled cellular card. A fingerprint-enabled cellular card, comprising: a processor; a fingerprint sensor; a visual indicator; and a non-transitory memory storing instructions which, when executed by the processor, cause the processor to power up the fingerprint-enabled cellular card upon receiving a power from an external power source housed within a computing device; where the fingerprint-enabled cellular card is without an internal power source; and where, when the fingerprint-enabled cellular card is powered up, the instructions further cause the processor to: detect a first fingerprint sample via the fingerprint sensor, where the first fingerprint sample is associated with a user of the fingerprint-enabled cellular card; and initiate an authentication process of the first fingerprint sample before at least one transaction event with the computing device, where the authentication process is based on a match between a second fingerprint sample stored in non-transitory memory and the first fingerprint sample; and where a determination of a match or no match between the first fingerprint sample and the second fingerprint sample is indicated by the visual indicator.

In some embodiments, the present disclosure provides a technically improved computer-based apparatus that includes at least the following components of a computer-based fingerprint-enabled cellular card. A fingerprint-enabled cellular card, comprising: a processor; a fingerprint sensor; a light-emitting diode; and a non-transitory memory storing instructions which, when executed by the processor, cause the processor to power up the fingerprint-enabled cellular card upon receiving a power from an external power source housed within a computing device; where the fingerprint-enabled cellular card is without an internal power source; and when the fingerprint-enabled cellular card is powered up, the processor is further configured to: receive via the fingerprint sensor a first fingerprint sample associated with a user of the fingerprint-enabled cellular card; configure the fingerprint-enabled cellular card to authenticate the user of the fingerprint-enabled cellular card based on a match between the first fingerprint sample and a second fingerprint sample; authenticate the second fingerprint sample before at least one transaction event; emit a light of a first light color via the light-emitting diode upon a determination that the second fingerprint sample has been successfully authenticated; and allow the at least one transaction event upon the determination that the second fingerprint sample has been successfully authenticated.

In some embodiments, the present disclosure provides a technically improved computer-based method that includes at least the following steps. A method comprising: powering up a fingerprint-enabled cellular card, by a processor, upon receiving a power from an external power source; where the fingerprint-enabled cellular card is without an internal power source and, where the fingerprint-enabled cellular card comprises a fingerprint sensor; receiving, by the processor, a first fingerprint sample of a user of the card via the fingerprint sensor; receiving, by the processor, a second fingerprint sample of the user of the card via the fingerprint sensor; determining, by the processor, whether there is a match between the first fingerprint sample and the second fingerprint sample stored in a non-transitory memory comprised in the fingerprint-enabled cellular card to allow or disallow the transaction.

In some embodiments, the present disclosure provides a technically improved computer-based system that includes at least the following components of an electronic-commerce fingerprint-enabled cellular card coupler system. The electronic e-commerce fingerprint-enabled cellular card coupler system comprises a card coupler that is powered by a computing device, and which communicates with a chip on a fingerprint-enabled cellular card and with a merchant through a mobile application. When the fingerprint-enabled cellular card is inserted in the card coupler, the coupler communicates with the fingerprint-enabled cellular card and the application on the merchant's website to transmit information stored on the chip to an authorization server as though the fingerprint-enabled cellular card had been used with a POS terminal at the merchant location.

In some embodiments, the present disclosure provides a technically improved computer-based system that includes at least the following components of a fingerprint-enabled cellular card with blue tooth account registration and activation. The system comprises a fingerprint-enabled cellular card with a fingerprint sensor, and a card coupler powered by a computing device and which communicates with a mobile application on the computing device. When a user places the user's finger on the fingerprint sensor on the card, and the fingerprint-enabled cellular card is inserted in the card coupler, the card communicates success or failure of the fingerprint registration to the application on the computing device using blue tooth low energy. The application on the computing device confirms whether registration of the user's fingerprint is successful or not. The fingerprint-enabled cellular card is activated if the fingerprint registration is successful and transactions can now be processed using the card.

In some embodiments, the present disclosure provides a technically improved computer-based system that includes at least the following components of a blue tooth enabled dynamic fingerprint-enabled cellular card with user controlled programmable identification numbers. The system comprises a dynamic fingerprint-enabled cellular card with a fingerprint sensor according to various embodiments disclosed herein and with programmable dynamic temporary card identification numbers according to embodiments disclosed herein. After a user authenticates the user's finger on the fingerprint-enabled cellular card, the user can use a mobile application on a computing device to communicate with the user's fingerprint-enabled cellular card via Bluetooth low energy and change the identification number on the user's fingerprint-enabled cellular card to a new and temporary value of the user's choice.

In some embodiments, the present disclosure provides a technically improved computer-based apparatus that includes at least the following components of a computer-based fingerprint-enabled digital display cellular card. The computer-based fingerprint-enabled digital display cellular card comprises a fingerprint-enabled cellular card comprising a fingerprint sensor according to embodiments disclosed herein, a power source; and a digital display on a fingerprint-enabled cellular card. Unlike a typical card, the fingerprint-enabled digital display cellular card does not have a permanent expiration date, primary account number, 4-digit card identification number, or a 3-digit card security code physically or statically embossed or printed on the card. Instead, the fingerprint-enabled digital display cellular card has a digital display that is able to digitally display these card numbers. When the card holder places their finger on the fingerprint sensor on the fingerprint-enabled cellular card and the card holder's fingerprint is authenticated, the digital display on the card illuminates on the digital display and digitally displays relevant card data and numbers including but not limited to a digital card expiration date, a digital primary account number, a digital 4-digit card identification value, or a digital 3-digit card security code.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

DETAILED DESCRIPTION

Figure 1:
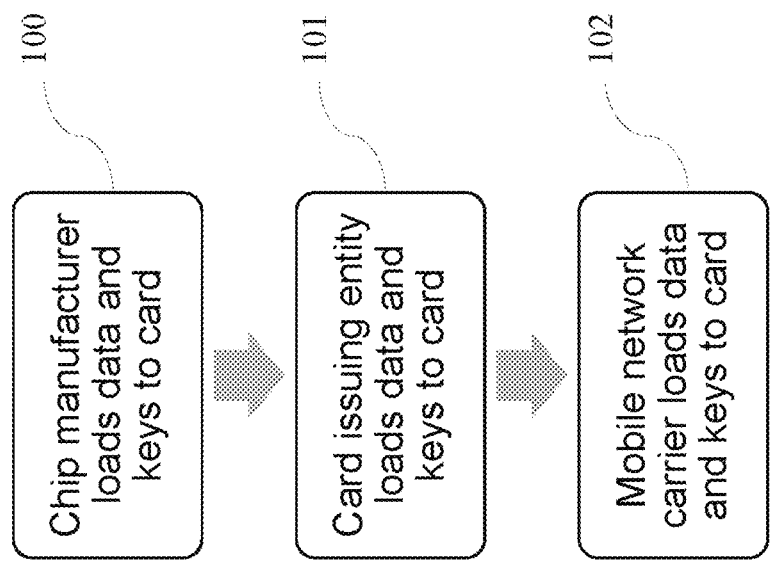
FIGS. 1-29 show one or more schematic flow diagrams, certain computer-based architectures, and/or implementations which are illustrative of some examples of aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

As used herein, the term "card" can refer to an electronic card with at least one embedded microprocessor. In some embodiments, a card can be contact-based or a contactless card. A contact-based card can include an integrated circuit chip and/or other physical or electrical terminals that allows the card to communicate with a computing device. In some embodiments, the card can be a contactless or dual interface ("DI") card that may additionally communicate from a distance with a computing device through radio frequency identification (RFID) technology, near field communication (NFC) technology, or other type of radio waves or signals. For example, when held at a predetermined distance from a computing device, a contactless card may be configured to use one or more antennas to transmit data stored in the card and receive data from a computing device.

In some embodiments, the card may be dimensioned and/or be utilized such as, but not limited to, a conventional credit or debit card issued to account holders by banks and other financial institutions. In some embodiments, the card may be dimensioned and/or be utilized such as, but not limited to, personal identification cards, health entitlement cards, store loyalty cards, stored value cards (electronic purses), information storage cards, and the like. In some embodiments, the card may be dimensioned, but not limited to, in accordance with international standard ISO/IEC 7810, ID-1 format, which specifies dimensions of 85.60 mm (85.60×10–3 m) long by 53.98 mm (53.98×10–3 m) wide. In some embodiments, the card may be dimensioned, but not limited to, in accordance with international standard ISO/JEC 7813 which further specifies the thickness as 0.76 mm (0.76×10–3 m). For example, the card may be made of a plastic material, metal or similar material, and may have convenient overall dimensions of 7.5 cm by 11 cm by 1 cm similar to a common wallet.

As used herein, the term "cellular card" can refer to the card that has been technologically improved to operate in accordance with the present disclosure and which may be recognized and registered by a mobile network carrier and associated with a mobile account of the cardholder and which can communicate with a cellular network.

A cellular card may include a "dynamic cellular card", a "finger-print enabled cellular card", a "fingerprint-enabled digital display card", a "dynamic fingerprint-enabled cellular card", or any subset or combinations of these cards.

As used herein, the term "dynamic cellular card" can refer to the card that has been technologically improved to operate in accordance with the present disclosure and that may comprise: temporary card identification numbers that may be electronically changeable by a remote host or a user; and which can communicate with a cellular network.

As used herein, the term "fingerprint-enabled cellular card" can refer to the card that has been technologically improved to operate in accordance with the present disclosure and that may comprise: a fingerprint sensor for fingerprint authentication or registration; and which can communicate with a cellular network.

As used herein, the term "dynamic fingerprint-enabled cellular card" can refer to the card that has been technologically improved to operate in accordance with the present disclosure and that may comprise: a fingerprint sensor for fingerprint authentication or registration; temporary card identification numbers that may be electronically changeable by a remote host or a user; and which can communicate with a cellular network.

As used herein, the term "fingerprint-enabled digital display cellular card" can refer to the card that has been technologically improved to operate in accordance with the present disclosure and that may comprise: a fingerprint sensor for fingerprint authentication or registration; a digital display to display temporary card identification or account numbers associated with the card; and which can communicate with a cellular network.

As used herein, the term "computing device" can refer to any electronic device that can receive, transmit, and/or process data stored in the dynamic cellular card. In some embodiments, a computing device can include a power source that may be able to power up the dynamic cellular card and receive data from a server.

As used herein a "point of sale (POS)" terminal can refer to the computing device implemented with a combination of hardware and software and can include a contact-based and/or a contactless card-reader device. In some embodiments, the contact-based card-reader device can communicate with the dynamic cellular card via an integrated circuit chip and/or other physical or electrical terminals embedded in the dynamic cellular card. In some embodiments, a contactless card-reader device can use RFID technology, NFC technology, or other type of radio waves or signals to communicate with the dynamic cellular card. In some embodiments, a "transaction event" between the dynamic cellular card and the computing device, such as a POS terminal, may include a contact-based transaction or a contactless transaction event. Non-limiting example of a POS terminal can include Shopkeep®, Lightspeed®, Touchbistro®, Upserve®, Toast®, Springboardretail®, Vend® or other suitable types of technologies.

The POS terminal may be on-premise or cloud based. On-premise POS terminals may install software and use data stored on local servers that run on a closed internal network. Cloud-based POS terminals may be subscription-based software as a service (SaaS) and accessed over the internet on any browser. POS terminals in the cloud may be independent from platform and operating system limitations, and may be compatible with a variety of POS hardware.

As used herein, term "cloud" and similar terms correspond to at least one of the following: (1) a large number of computers connected through a real-time communication network (e.g., Internet); (2) providing the ability to run a program or application on many connected computers (e.g., physical machines, Virtual Machines (VMs)) at the same time; (3) network-based services, which appear to be provided by a hardware of one type running (Operating System) OS of one type may emulate hardware of a different type and/or an OS of a different type, and are in fact served up by virtual hardware (e.g., virtual servers), simulated by software running on one or more real machines (e.g., allowing to be moved around and scaled up (or down) on the fly without affecting the end user).

As used herein, the term "card identifying data" can include data or keys that may allow a mobile network carrier to recognize and register a card and associate the card with a user mobile account of a user associated with the card. "Card identifying data" may also include geo-location data identifying a physical location of the card such as Global Positioning System ("GPS") data.

As used herein, the term "user mobile account" can refer to a mobile account of a user or card holder provided by a mobile network carrier.

As used herein, the term "user mobile account data" can refer to data associated with a user mobile account that can be used to access your server-based network user account remotely.

As used herein, the term "user card account" can refer to an account of a user associated with a card. In some embodiments, the user card account may comprise data regarding the card holder including but not limited to personal data e.g., name, address, social security number, telephone numbers, or other suitable personal data) or purchase or transaction data. In some embodiments, the entity that issued the card may provide the user card account.

As used herein, the term "user-associated private key" can refer to a password, phrase, or other code associated with a user's mobile account data and which may allow authentication of the card or user. In some embodiments, a user-associated private key may be private and/or secure and may be encrypted.

As used herein, the term "mobile network carrier" can refer to any known wireless service provider that provides cellular services to mobile phones or other devices. Mobile network carriers can include but are not limited to providers such as T-Mobile®, Verizon®, Sprint®, or AT&T®.

As used herein, the term "card holder", "user of a/the card" or "card user" can be at least one user or at least one non-person entity associated with the card.

As used herein, a "power" can refer a rate at which energy is transferred to and from a part of an electric circuit. For example, the power can be transferred by supplying AC or DC electrical charge in a contact-based interaction. For example, the power can be transferred inductively, by generating, but not limited to, time-varying electromagnetic field during a contactless interaction between a transmitting device and a receiving device that converts the received power to DC or AC electric charge to be used by the electric circuit hosted by the receiving device.

As used herein a "power source" can refer to a suitable source of supplying the power. For example, the power source is a source of AC or DC power supplied during the contact-based interaction and can be functionally equivalent to plugging into a wall power source or charging from another device such as a desktop or laptop computer. For example, the power source is a source of AC or DC power combined with a transmitting device that generates, but is not limited to, time-varying electromagnetic field during a contactless interaction between the transmitting device having a transmitting antenna and a receiving device having a receiving antenna.

As used herein an "external power source" is the power source supplying the power to the card but which resides separately from the dynamic cellular card. For example, as disclosed herein, a POS terminal can be the external power source. In some embodiments, the external power source can supply electrical charge via a contact-based interaction between electrical terminals of the dynamic cellular card and electrical terminals of the external power source. In some embodiments, the external power source can supply, additionally or alternatively, electrical charge via a contactless interaction between the dynamic cellular card and the external power source.

As used herein an "internal power source" is the power source that is not the external power source. In some embodiments, the internal power source resides within the dynamic cellular card and can include, but not limited to, a primary battery, a rechargeable battery, or an alternative power source. For example, an alternative power source, or a combination of alternative power sources can be, but not limited to, a super capacitor, a solar cell, and/or a bioenergy power source.

As used herein a "permanent card identification number" can refer to, for example, a set of numbers used to identify a card issuer and a card holder.

As used herein a "temporary card identification number" can refer to, for example, a Card Verification Value (CVV), a Card Verification Code (CVC), a Card Identification Number (CID), or other suitable number associated with a card.

As used herein a "transaction event" can refer to a contact-based and/or contactless transaction performed with a card and a computing device. In some embodiments, the computing device can refer to a POS terminal. In some embodiments, a transaction event can include a purchase event associated with an amount and at least one purchased item. In some embodiments, a transaction event can refer to an e-commerce transaction, a transaction made using a POS terminal, or other suitable transactions.

The following embodiments provide technical solutions and/or technical improvements that overcome security technical problems, drawbacks and/or deficiencies in the technical field of cards. As explained in more detail below, technical solutions and/or technical improvements herein include aspects of improved card systems resilient to fraudulent use. Moreover, various practical applications of the disclosed technology are also described, which provide further practical benefits to users and operators that are also new and useful improvements in the art.

In some embodiments, a dynamic cellular card can be used to accomplish different types of secure transactions including transactions via a computing device, contactless transactions, and e-commerce transactions, over the phone transactions, and other suitable types of transactions. Various embodiments are directed to the technical problem of unsecure or fraudulent transactions providing at least one technical solution that includes recurrently changing card identification numbers shown on a card display. For example, the showing of the permanent Card Verification Value (CVV), Card Verification Code (CVC), or Card Identification Number (CID) on the card facilitates fraudulent transactions. Instead, various embodiments of the present disclosure provide various technical solutions to such a technical problem by allowing dynamic cellular cards of the present disclosure to display the temporary card identification number based on encrypted communications. In some embodiments, the temporary card identification number prevents fraudulent transactions by being a single-use number. In some embodiments, the temporary card identification number prevents fraudulent transactions by being a time-limited use number.

Various embodiments provide a technical solution by enabling the dynamic cellular card to operate without an internal battery, powered up by an external power source, overcoming technical problems associated with battery overheating, battery short life time, battery underperformance in extreme temperatures, and other types of drawbacks associated with batteries contained in cards and other suitable devices.

In some embodiments, a fingerprint-enabled cellular card can include a fingerprint sensor and a non-transitory memory that stores a fingerprint sample collected from the fingerprint sensor and associated with a user or card holder. Some embodiments of the present disclosure are directed to a technical problem of unsecure and fraudulent transactions. In some embodiments, the fingerprint-enabled cellular card of the present disclosure solves this problem by at least deterring unsecure or fraudulent transactions by executing an authentication process when the fingerprint-enabled cellular card is used. In some embodiments, the fingerprint-enabled cellular card is configured to authorize a transaction when a fingerprintsample read via the fingerprintsensor matches the fingerprintsample stored in the non-transitory memory. Some embodiments of the present disclosure are directed to a technical problem of batteries contained in a fingerprint-enabled cellular card, such as, but not limited to, battery overheating, battery short life time, battery underperformance in extreme temperatures, and other types of drawbacks associated with batteries contained in cards. In some embodiments, the fingerprint-enabled cellular card of the present disclosure solves this problem by not requiring a battery or any power source contained within the fingerprint-enabled cellular card. In some embodiments, the fingerprint-enabled cellular card can operate without an internal battery and is powered up by an external power source, overcoming drawbacks associated with batteries contained in cards and other suitable devices.

Some embodiments of the present disclosure are directed to a technical problem of batteries contained in a card, such as, but not limited to, battery overheating, battery short life time, battery underperformance in extreme temperatures, and other types of drawbacks associated with batteries contained in cards. In some embodiments, the card of the present disclosure solves this problem by not requiring a battery or any power source contained within the card. In some embodiments, the card can operate without an internal battery and is powered up by an external power source, overcoming drawbacks associated with batteries contained in cards and other suitable devices.

FIGS. 1-29 illustrate examples of apparatus and methods of computer-based cards, in accordance with the present disclosure.

FIG. 1 illustrates an example of a block diagram of an implementation of a cellular card, in accordance with one or more embodiments of the present disclosure. As shown in FIG. 1, to enable secure financial transactions, at step 100, chip manufacturers may load data, including customer-supplied or encrypted keys, onto chips that are embedded on cards. At step 101, card issuing entities may also load data onto the cards. The data loaded by the card issuing entities may also include data and keys used to pre-personalize or personalize cards.

At step 102, at least one mobile network carrier may also load a private key and associated mobile network carrier data onto the card. The data loaded by the mobile carrier networks may include data and keys used to pre-personalize or personalize smart phone cards or the chips on mobile phones, such as Subscriber Identity Module ("SIM") cards, and may include customer-supplied or encrypted keys that allow authentication of the card by the mobile network carrier.

Figure 2:
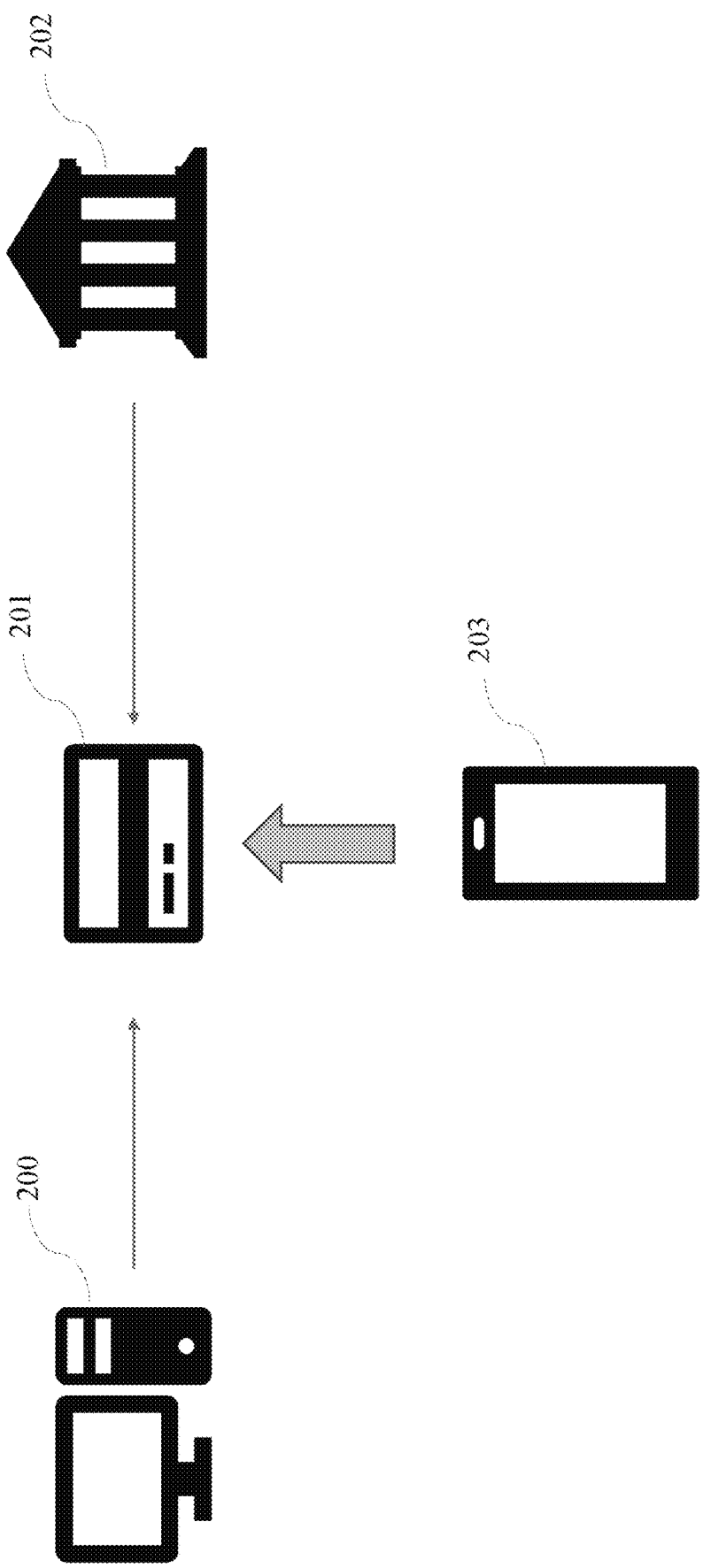

In accordance with one or more embodiments of the present disclosure, FIG. 2 depicts chip manufacturer 200 loading data and associated private keys onto card 201. Card issuing entity 202 also loads data and associated private keys onto card 201. Mobile carrier network 203 also loads data and associated carrier network onto card 201.

Figure 3:
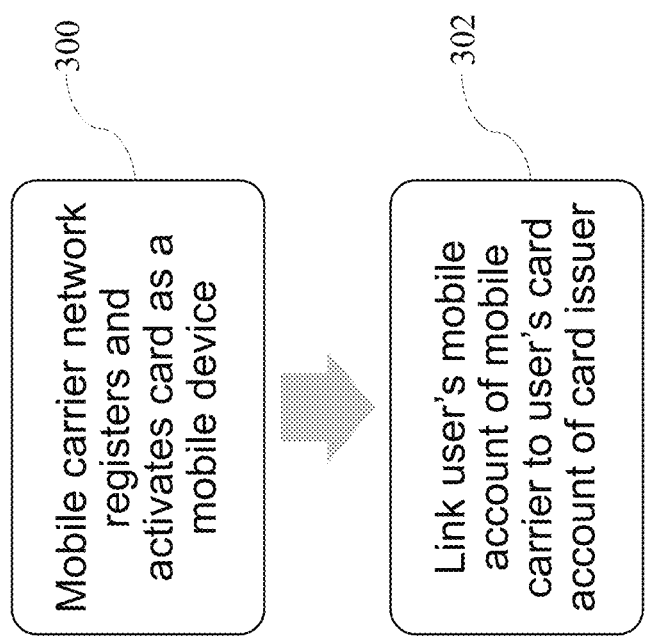

FIG. 3 is an illustrative block diagram of an example of an implementation of a cellular card, according to one or more embodiments of the present disclosure. At step 300, the mobile carrier network registers and activates the cellular card as a mobile device of the card holder. At step 301, the user's mobile account of the mobile carrier is linked to the user's card account of the card issuer such that the two linked accounts can communicate and share information with each other.

Figure 4:
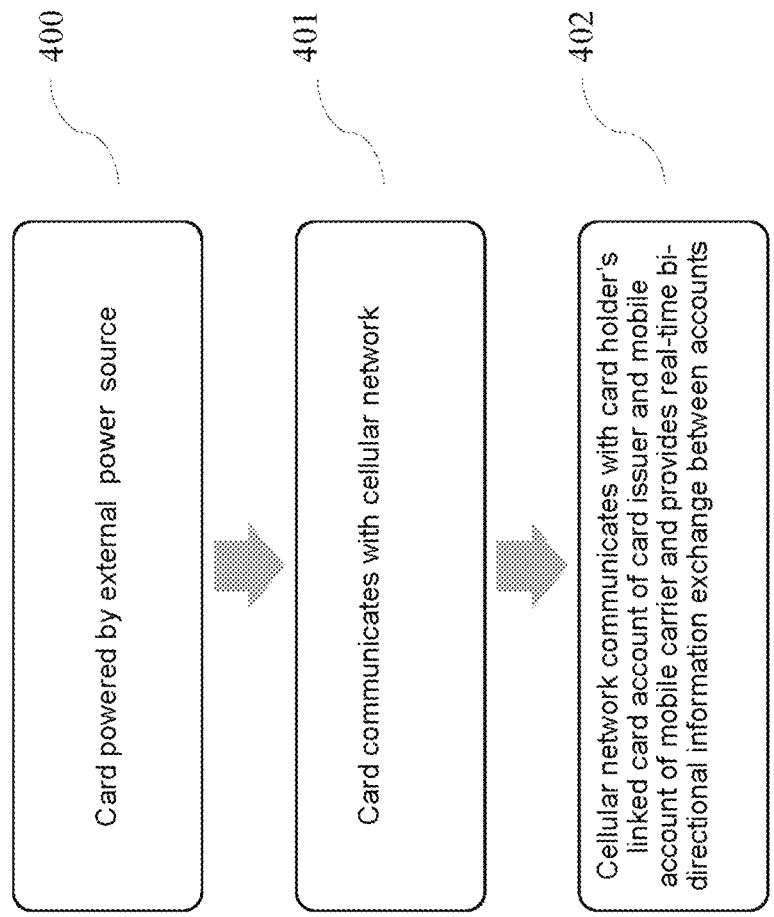

In accordance with one or more embodiments of the present disclosure, FIG. 4 depicts an example of a cellular card and computing device of the present disclosure. At step 400, the cellular card is powered by an external power source. When powered by an external power source, at step 401, the cellular card is configured to communicate with a cellular network. At step 402, the cellular network communicates with card holder's linked card account of card issuer and mobile account of mobile carrier and provides real-time bi-directional information exchange between the accounts.

Figure 5:
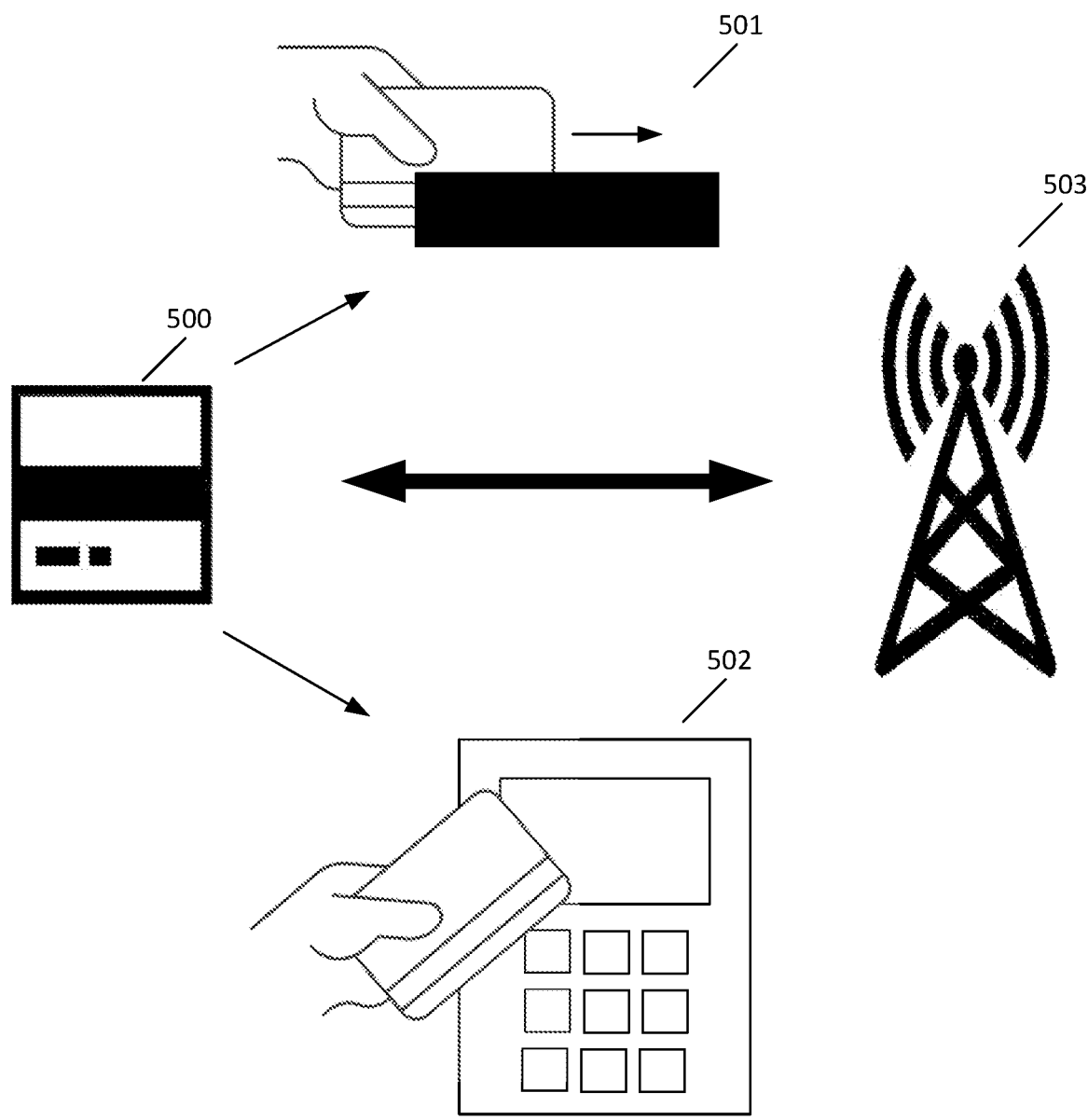

FIG. 5 depicts an illustrative schematic in accordance with at least some embodiments of the present disclosure in which cellular card 500 may be powered by an external power source and communicates with a cellular network. At step 501, cellular card 500 may be powered by contact insertion or swiping into a computing device such as a POS terminal. At 502, cellular card 500 may be powered by for example, tapping the cellular card against a computing device 502 or using cellular card 500 in a contactless manner with a computing device 502, by holding cellular card 500 at a predetermined distance from a computing device 502 until cellular card 500 transmits and receives data from the computing device. Regardless of whether cellular card 500 is used in a contactless or contact-based manner, the computing devices 501 and 502 may supply power to the cellular card that allows cellular card 500 to communicate with cellular network 503. Cellular card 500 may, for example, provide geo-location data to the cellular network tower. Other data may additionally be transmitted between the cellular card and the cellular tower and between the cellular tower and the card holder's linked payments and mobile accounts.

Cellular card 500 may use at least one or more antennas that may be able to send relevant signals to a cellular network 503 or a computing device (including but not limited to 501 or 502) over a cellular frequency. When cellular card 500 is also a dual interface ("DI") payments card/contactless card, cellular card 500 may be configured to utilize multiple antennas.

An example of one of the embodiments of the present disclosure may comprise the following. At card initialization, chip manufacturer 200 pre-personalizes the chip that is embedded in card 200 with data and associated keys. Chip manufacturer 200 sends the chip to card issuing entity 202 who also securely loads its own data and keys onto the chip to pre-personalize the chip. Chip issuing entity then affixes the pre-personalized chip onto card 201.

Card 201 may be registered with the mobile carrier network 203 as a mobile device of the user such that the card is now a mobile device on the card holder's mobile account ("a cellular card"). The card holder's mobile device account and financial transaction accounts may further be linked to facilitate communication between the card holder's mobile device account and the cellular card holder's financial transactions'/payments' account. For example, the card holder may visit a brick and mortar mobile store such as Verizon or T-Mobile and register their card as a mobile device on their mobile account at Verizon or T-Mobile and link their mobile account to their payments account. The card holder may also use their mobile wallet application to perform secure registration and linkage of their accounts.

In some embodiments, when the card is powered up, the processor on card 201 may register card 201 with a user mobile account of a user associated with card 201 and transform card 201 into a user-associated mobile card device ("a cellular card"). The processor on card 201 may receive, from the mobile network carrier 203, user mobile account data that comprises a user-associated private key and transmit the user mobile data to a computing device of a card issuing entity 202 that issued card 201 in order to associate the user mobile account with the user's payment account based at least in part on the user-associated private key; and share the user mobile account data and payments account data between the mobile network carrier 203 and the card issuing entity 202.

An example of one of the embodiments of the present disclosure may comprise the following. When cellular card 500 is powered up by an external power source 501 or 502, a processor on card 500 may establish, via an antenna on a chip on card 500, a first wireless communication with at least one cellular network tower 503 associated with a mobile network carrier during an interaction between card 500 and computing device 502 or 503. The processor on card 500 may provide, with the first wireless communication, card identifying data to the mobile network carrier. As earlier defined, card identifying data includes but is not limited to data or keys that may allow a mobile network carrier to recognize and register a card and associate the card with a user mobile account of a user associated with the card. Card identifying data may also include geo-location data identifying a physical location of the card such as "Global Positioning System" ("GPS") data.

Further, the processor on card 500 may establish via at least one cellular network tower 503, a second communication with the computing device of a card issuing entity to transmit user mobile account data to the computing device of the card issuing entity. Cellular card 500 may transmit information regarding the financial transaction at issue, such as a purchase event, including but not limited to an amount and at least one purchased item.

The second communication may also include the generation of an alert, such as a ping, to cellular network 503. The data may also comprise geo-location data identifying a physical location of card 500 such that information regarding the whereabouts of the cellular card and its use may be transmitted to the computing device of a card issuing entity for further transmission to the card holder.

When cellular card 500 is powered up by computing device 501 or 502, the processor on cellular card 500 may establish via an electronic wallet application associated with the card issuing entity and executed on another mobile device, a second communication with the computing device of card issuing entity to transmit user mobile account data to the card issuing entity computing device of the card issuing entity.

When cellular card 500 is powered up by computing device 501 or 502, the processor on cellular card 500 may also establish, via the computing device 501 or 502, a second communication with the card issuing entity computing device to transmit user mobile account data to the computing device of the card issuing entity.

Based on the communications between cellular card 500 and cellular network 503, cellular card 500 may be able to alert the card holder, financial services company, or mobile network carrier, or any relevant party connected to cellular network 503 that cellular card 500 is in use, and information regarding cellular card 500, including but not limited to the physical location of cellular card 500 may be obtained. The card holder, financial services company, or mobile network carrier may be able to make and take further decisions regarding cellular card 500, including determining whether use of cellular card 500 is fraudulent, and disabling and enabling use of cellular card 500 as necessary.

The advantages of the system and method disclosed herein over existing systems include the following: providing a payments card with "cellular" capabilities by making the card capable of using the card holder's mobile account to collect data including for example, real time notification of where the card is being used. While the cellular card continues to provide payment card capabilities, when powered by an external power source, the cellular card may also send data to the nearest cellular tower. This may include registering the card as a mobile device of the card holder and linking the payment account of the cellular card to the mobile account and allowing data between the two accounts to be shared and utilized. Communication between the cellular card and the cellular network enables the card to communicate with the card holder (applications provider or mobile network carrier) over the established cellular infrastructure and provide real-time information without depending on the merchant POS terminal for communication to a host. The cellular card may deter fraud since the card can act as a tracking device that may not be easily disabled like a phone, but which may still be used for payments.

Figure 6:
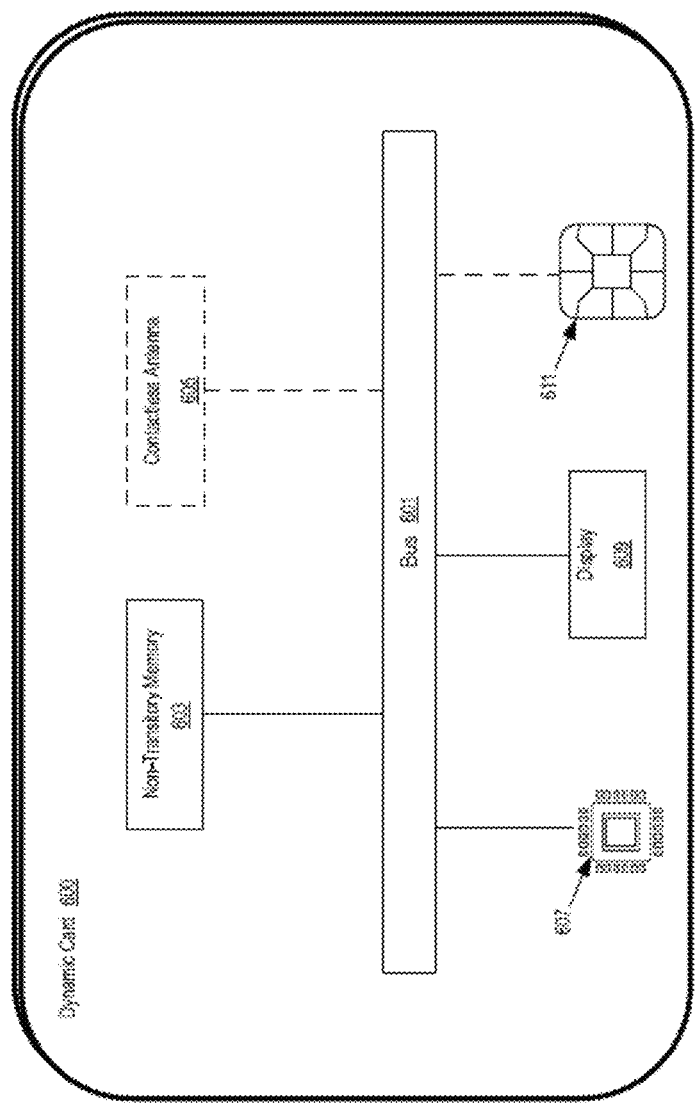

FIG. 6 illustrates an example of an implementation of a dynamic cellular card 600, in accordance with one or more embodiments of the present disclosure. In some embodiments, the dynamic cellular card 600 can include a communication bus 601, a processor 607, a non-transitory memory 603, an output device interface such as, but not limited to, display 609, and at least one of: a contactless antenna 605 (in embodiments having the contactless interactions) an integrated circuit chip 611 (in embodiments having the contact-based interactions), or a combination of the contactless antenna 605 and the integrated circuit chip 611 (in embodiments having capability for the contactless and/or contact-based interactions).

In some embodiments, the communication bus 601 communicatively connects two or more internal devices of the dynamic cellular card 600. For example, the communication bus 601 can be, for example, a physical interface for interconnecting the various components or internal devices.

In some embodiments, the dynamic cellular card 600 may include a processor 607 configured to perform instructions upon receiving power from an external power source provided via the communication bus 601 by, e.g., the computing device not shown in FIG. 6.

In some embodiments, the non-transitory memory 603 may include any type of computer memory that retains data after the dynamic cellular card 600 is powered off. For instance, the non-transitory memory 603 can store one or more encrypted card identification numbers with time stamps, where such card identification numbers include temporary card identification numbers that can be updated throughout multiple interactions between the dynamic cellular card 600 and other computing devices as discussed below with reference to FIGS. 8-13.

In some embodiments, display 609 can be an electrophoretic display or other suitable display that retains an image even when all power sources are removed from the dynamic cellular card generally or the display specifically. In some implementations, the display 609 may only consume power whenever the displayed image changes. The display 609 can display temporary card identification numbers retrieved and decrypted from a set of encrypted card identification numbers stored in the non-transitory memory 603.

In some embodiments, contactless antenna 605 can include a Radio Frequency Identification (RFID) system, a Near Field Communication (NFC) system or other suitable system that enables the dynamic cellular card 600 to transmit data to other computing devices in a contactless interaction. In some implementations, the contactless antenna 605 can receive electromagnetic waves (e.g., by radio frequency induction) from a computing device, wherein such electromagnetic waves can power up the dynamic cellular card 600. In some instances, the dynamic cellular card 600 can be powered up via the contactless antenna 605 and thereafter retrieve and decrypt a temporary card identification number from the set of encrypted card identification numbers stored in the non-transitory memory 603. The dynamic cellular card 600 can then show the temporary card identification number on the display 609 such that the number remains shown on the display after the contactless interaction has been terminated.

In some embodiments, the integrated circuit chip 611 can provide the dynamic cellular card 600 with electrical connectivity to an external power source when inserted into a computing device. In some embodiments, the integrated chip may comply with the EMV standard published by EMVco. In some embodiments, the processor 607 can be embedded into the integrated circuit chip 611. In some instances, upon interaction with the computing device, the dynamic cellular card 600 sends and receives information from the computing device and/or a server in communication with the computing device. In some instances, the dynamic cellular card 600 receives a set of encrypted card identification numbers from the server in communication with the computing device or reader device.

In some instances, the display 609 displays a first temporary card identification number prior to the interaction between the dynamic cellular card 600 and the computing device (e.g., POS terminal). After the dynamic cellular card 600 is powered up upon the interaction with the computing device, instructions stored in the non-transitory memory 603 cause the processor 607 to receive and store in the non-transitory memory 603 one or more encrypted card identification numbers from at least one server in communication with the computing device, retrieve an encrypted card identification number from the non-transitory memory 603 and decrypt the encrypted card identification number to obtain a second temporary card identification number, and replace the first temporary card identification number with the second temporary card identification number on the display 609. For example, the instructions stored in the non-transitory memory 603 cause the processor 607 to decrypt the encrypted card identification number utilizing, without limitation, private/public key pair techniques, Triple Data Encryption Standard (3DES) techniques, block cipher algorithms (e.g., IDEA, RC2, RC5, CAST and Skipjack), and/or cryptographic hash algorithms (e.g., MD5, RIPEMD-160, RTRO, SHA-1, SHA-2, Tiger (TTH), WHIRLPOOL, RNGs).

Figure 7:
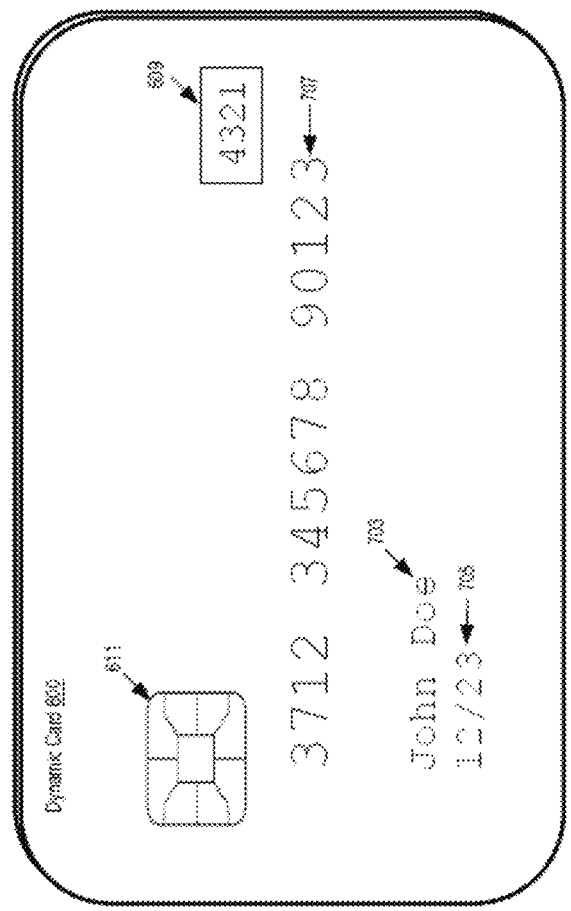

FIG. 7 illustrates an example of a dynamic cellular card, in accordance with one or more embodiments of the present disclosure. In some implementations, the dynamic cellular card 700 can be associated with a user. In this example, the user name may be engraved on the dynamic cellular card as shown at 703. The dynamic cellular card 700 can also include an expiration date as shown at 705. In some implementations, the dynamic cellular card 700 can include a permanent card identification number as shown at 707 and a temporary card identification number shown on display 709. The permanent identification card number and/or the temporary identification card number can be associated with a credit card account. The user name 703 engraved or printed on the dynamic cellular card may be responsible for or associated with such credit card account. In some instances, the permanent card identification number 707 can be used in conjunction with the temporary card identification number shown on display 709 to interact with a computing device. For example, the permanent card identification number 707 and the temporary card identification number shown on display 709 can be utilized to execute secured transactions, authenticate a card holder, or other suitable interactions with a computing device. For another example, the permanent card identification number can be used in an interaction with a computing device while the temporary card number is updated or changed by the computing device. In some instances, one or more of the information shown at 703, 705, 707, and 709 can be transmitted to a computing device via the integrated circuit 111 or via the contactless antenna 605 discussed with reference to FIG. 6.

Figure 8:
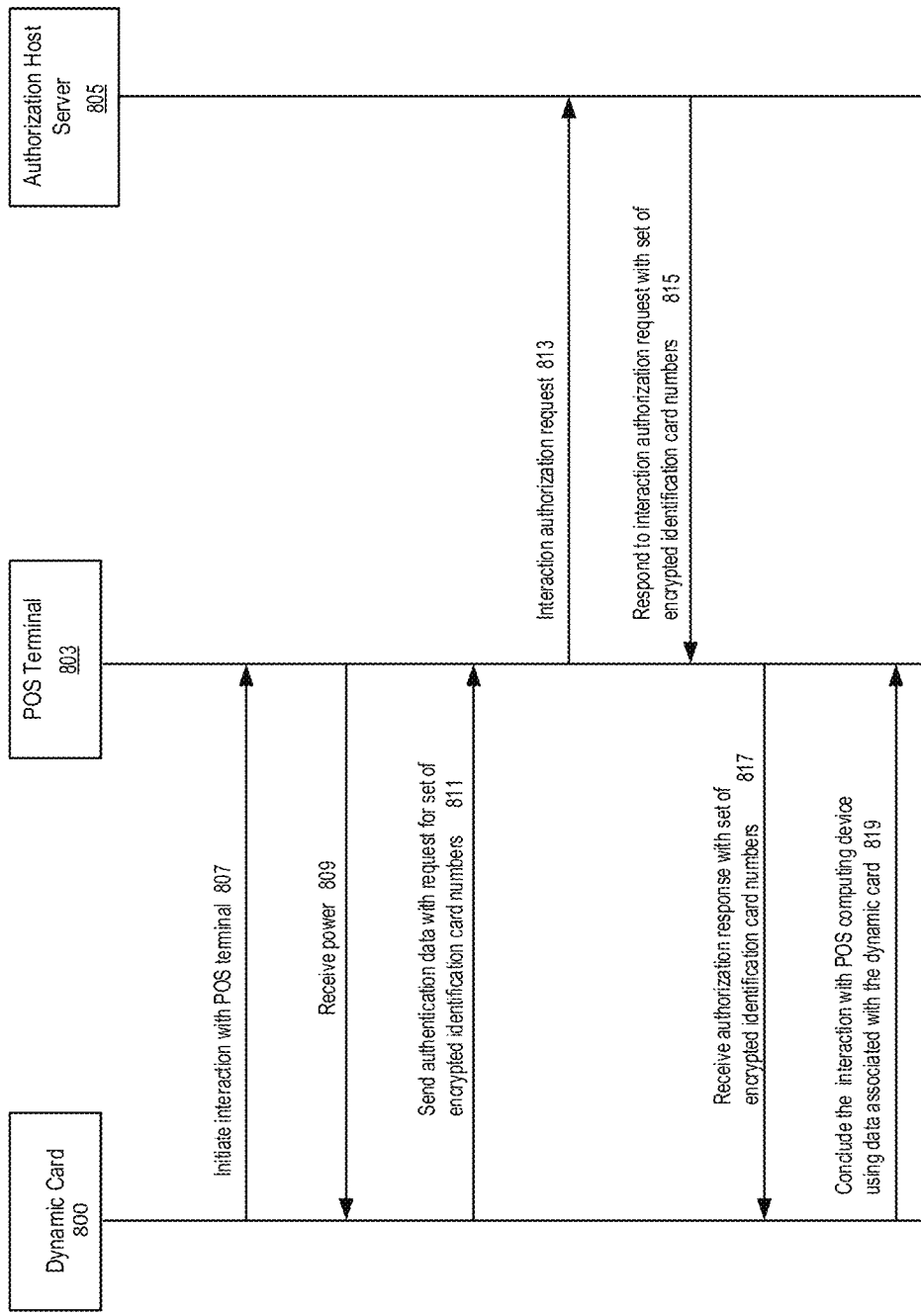

FIG. 8 illustrates a swim lane diagram illustrating examples of computations executed by the dynamic cellular card, in accordance with one or more embodiments of the present disclosure. The swim lane diagram shown in FIG. 8 includes operations of the dynamic cellular card 600, a computing device such as a point of sale (POS) terminal 803, and an authorization host server 805. A POS terminal 803 is a computing device that can include a card-reader device and be implemented with a combination of hardware and software enabling retail locations to accept card payments. A POS terminal can read information from a dynamic cellular card 800 via a card-reader device and, in combination with the authorization host server 805 and other systems as appropriate, verify whether the funds available to the user are sufficient for a transaction, transfer funds from a customer's account to a seller's account, and/or record the transaction in the customer and seller accounts. In some instances, the dynamic cellular card can initiate an interaction with the POS terminal 803. As discussed above, in some instances, the initiation of the interaction can include inserting the dynamic cellular card 600 into the POS terminal for the contact-based interaction. As discussed above, in some instances, the initiation of the interaction can include moving the dynamic cellular card 600 near or proximate to the POS terminal so that the receiving antenna 605 of the dynamic cellular card 600 can receive the power from a transmitting antenna of the POS terminal and is subject to electromagnetic field such that the interaction can be a contactless interaction. At 809, the dynamic cellular card 600 receives power (e.g., electrical charge, electromagnetic waves) from an external power source, in this case from the POS terminal 803.

In some embodiments, the dynamic cellular card 600 may determine whether encrypted card identification numbers should be obtained based on the satisfaction of a condition. In some embodiments, the condition may be based on information that is available to the dynamic cellular card 600 without retrieving additional information from other components of the system 1300 described in FIG. 13. For instance, processor 607 may compare and determine whether the quantity of additional encrypted card identification numbers stored in non-transitory memory 603 exceeds a threshold. The threshold may be fixed (e.g., zero or another positive number less than 5) or dynamically determined (e.g., based on how frequently the dynamic cellular card 600 was recently used to make purchases that require the use of a temporary card identification number). In addition, or alternatively, when dynamic cellular card 600 is inserted in POS terminal 803, it may be provided with a signal from authorization host server 805 that encrypted card identification numbers should be obtained in addition to, or as a replacement for, the encrypted card identification numbers stored in non-transitory memory 603 (if any). In other embodiments, the condition may be based on information that is retrieved from devices external to the dynamic cellular card 600, such as an indication from authorization host server 805 via POS terminal 803 to retrieve additional encrypted card identification numbers.

Thereafter, at 811 the dynamic cellular card 600 can send authentication data with a request for a set of encrypted card identification numbers to the POS terminal 803. Such authentication data can include a name 703, expiration date 705, permanent identification number 707, and temporary card identification number rendered on the display 609 discussed with reference to FIG. 7 and/or other suitable authentication data or data computed by the dynamic cellular card for the interaction with the POS terminal 803.

In some embodiments, at 813 the POS terminal 803 can send an interaction authorization request to the authorization host server 805. Such a request can be sent via the cloud or network discussed with reference to FIG. 13, or other suitable type of computing device communication system. In some instances, the interaction authorization request can include one or more of the data sent by the dynamic cellular card 600 to the POS terminal 803 including a request for a set of encrypted card identification numbers.

In some embodiments, the authorization host server 805 can, in real-time, authenticate the dynamic cellular card 600 and produce a set of encrypted card identification numbers. Accordingly, the authorization host server 805 can authorize the interaction and respond to the interaction authorization request with a set of encrypted card identification numbers as shown at 815. Such a set of encrypted card identification numbers can be preapproved by the authorization host server for a user, such that, the user can utilize decrypted card identification numbers from the set of encrypted card identification numbers in electronic transactions, for example, e-commerce transactions, transactions made through a POS terminal, or other suitable transactions. Thereafter, the dynamic cellular card 600 can receive the authorization response with the set of encrypted identification numbers from, for example, the POS terminal 803 as shown at 817. The dynamic cellular card 600 can then store the set of encrypted identification numbers in the non-transitory memory 603, select, and decrypt an identification number from the set of encrypted identification numbers to produce a new temporary card identification number. As discussed above, the dynamic cellular card 600 can show the new temporary card identification number on the display 609 while the dynamic cellular card 600 is being powered up by the POS terminal 803. Thereafter, at 819 the dynamic cellular card 600 can conclude the interaction with the POS terminal 803 using data associated with the dynamic cellular card 600. The new temporary card identification number can remain shown on the display 609 and be utilized in a second interaction with for example, a second computing device. For instance, the webpage of a merchant may prompt the user to enter the temporary card identification number shown on the display 609 when the user engages in a transaction, and the temporary card identification number may be used to authenticate the transaction.

Figure 9:
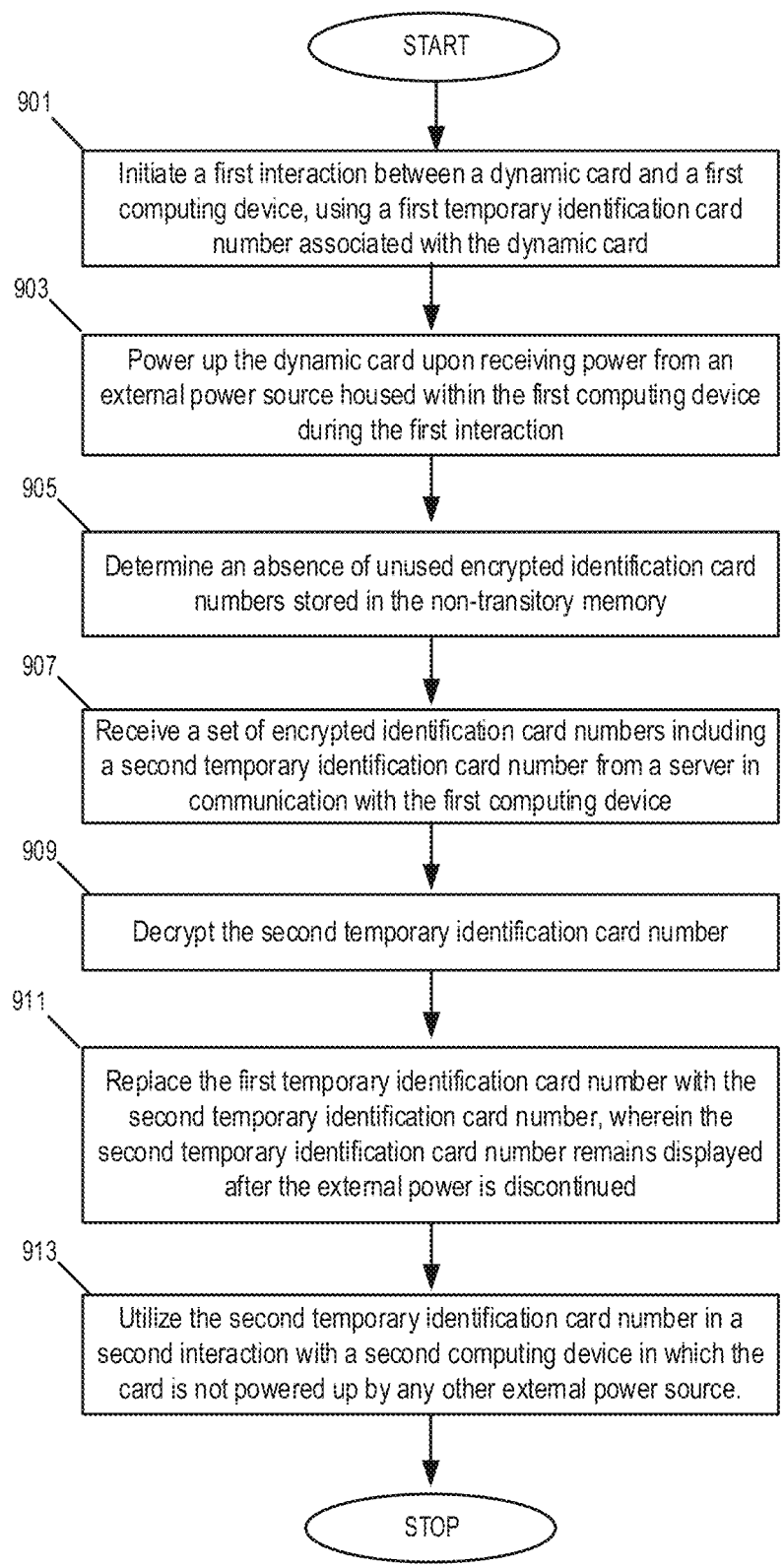

FIG. 9 is a flowchart illustrating examples of computations executed by the dynamic cellular card 100, in accordance with one or more embodiments of the present disclosure. In some instances, the dynamic cellular card 600 can initiate a first interaction with a computing device using, for example, a first temporary card identification number and a permanent card number associated with the card as shown at 901. As discussed above, the dynamic cellular card 600 can power up from an external power source, for example using power from the computing device during the interaction as shown at 903. In some instances, the dynamic cellular card 600 can determine an absence of unused encrypted card identification numbers as shown at 405.

In some embodiments, the dynamic cellular card 600 can send a signal to an authorization server via the computing device to request a set of encrypted card identification number and in response to the request receive the set of encrypted card identification numbers as shown at 907. Thereafter, at 909 the dynamic cellular card 600 can decrypt a second temporary card identification number selected from the set of encrypted card identification numbers. At 911, the dynamic cellular card 600 can replace the first temporary card identification number with the second temporary card identification number. The dynamic cellular card 600 renders on the display the second temporary card identification number. The second temporary card identification number can remain shown on the display after the first interaction with the computing device is terminated. In some instances, as shown at 913, the dynamic cellular card 600 can use the second temporary card identification number in a second interaction with for example, a second computing device in which the card is not powered up by any other external power source, for example, in an e-commerce transaction where a user submits data associated with the dynamic cellular card. Such data can include, for example, a permanent card identification number, the second temporary card identification number, user name, expiration date or other suitable data.

Figure 10:
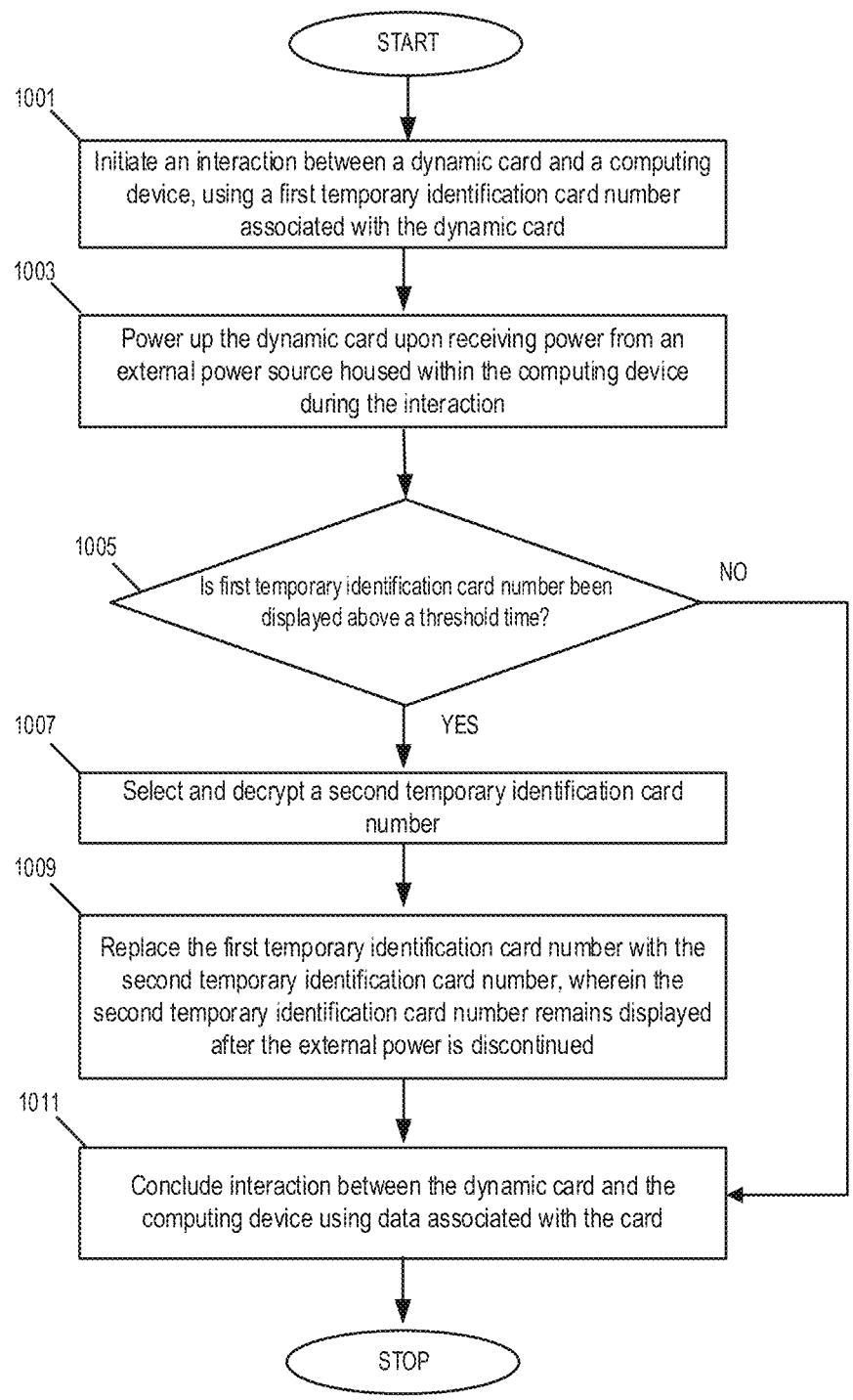

FIG. 10 is a flowchart illustrating examples of computations executed by the dynamic cellular card, in accordance with one or more embodiments of the present disclosure. In some instances, the dynamic cellular card 600 can initiate an interaction with a computing device using a first temporary card identification number associated with the dynamic cellular card as shown at 1001. Such an interaction can be, for example, a contactless interaction, an insertion of the card into the computing device or other suitable type of interaction. In some instances, as shown at 1003, the dynamic cellular card 600 can power up with power received from the computing device during the interaction, for example, in a contactless interaction, the card can receive RFID signals or electromagnetic waves from the computing device that can power up the dynamic cellular card 600.

In some embodiments, the dynamic cellular card 600 can determine if a first temporary card identification number has been displayed on the dynamic cellular card above a threshold time as shown in the conditional statement 1005. In some instances, such a determination can be made based on a timestamp associated with the first temporary card identification number. In some instances when the first temporary card identification number has not been displayed above the predetermined threshold time, the dynamic cellular card 600 concludes the interaction with the computing device using data associated with the dynamic cellular card 600 as shown at 1011. Such data can include, for example, a permanent card identification number, a user name, an expiration date, a temporary card identification number or other suitable data associated with the dynamic cellular card 600.

In some embodiments, when the dynamic cellular card 600 determines that the first temporary card has been displayed on the card above a predetermined threshold time as shown in conditional statement 1005 the flow proceeds to 1009. At 1009 the dynamic cellular card 600 can select and decrypt a second temporary card identification number. The second temporary card identification number can remain displayed after the external power is discontinued. Thereafter, the flow proceeds to 1011 as discussed above. It is noted that in some instances, the data associated with the dynamic cellular card 600 can include the first temporary card identification number or the second temporary card identification number depending on the outcome of the conditional statement 1005 discussed above.

Figure 11:
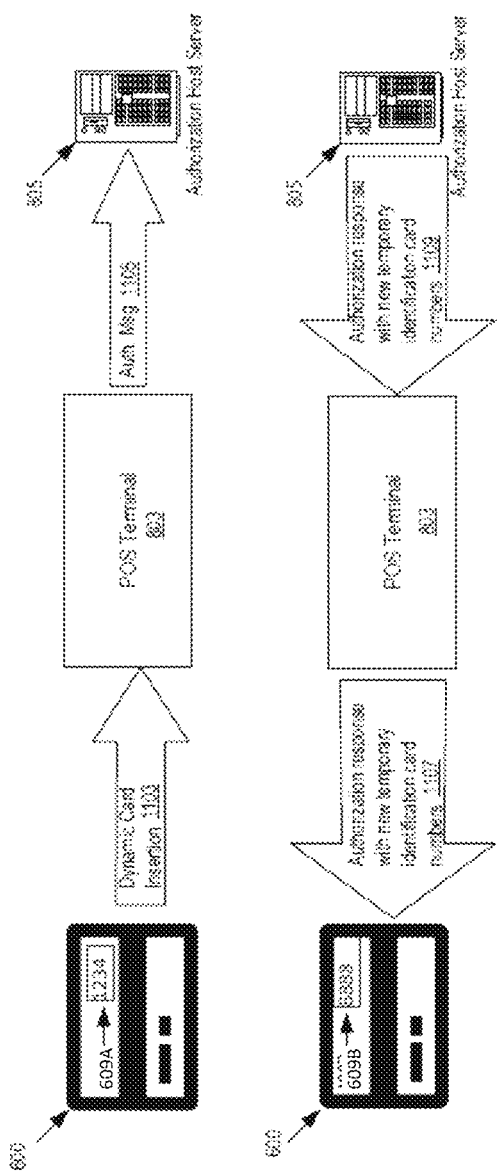

FIG. 11 are examples of interactions between the dynamic cellular card 600 and a computing device, in accordance with one or more embodiments of the present disclosure. In some instances, the dynamic cellular card 600 can be associated with a first temporary card identification number 609A. The dynamic cellular card 600 can be inserted into a computing device, for example, POS terminal 803. The POS terminal 803 can send an authorization message 1105 to the authorization host server 805. In some instances, the authorization host server 805 can send an authorization response 1109 with a set of new encrypted card identification numbers. The dynamic cellular card 600 can receive the authorization response 1107 with the set of new encrypted card identification numbers. Thereafter, the dynamic cellular card 600 can select and decrypt an encrypted card identification number from the set of new encrypted card identification numbers to produce a second temporary card identification number. The second temporary card identification number 609B can be shown on the dynamic cellular card 600 and used in a subsequent interaction with a different computing device.

Figure 12:
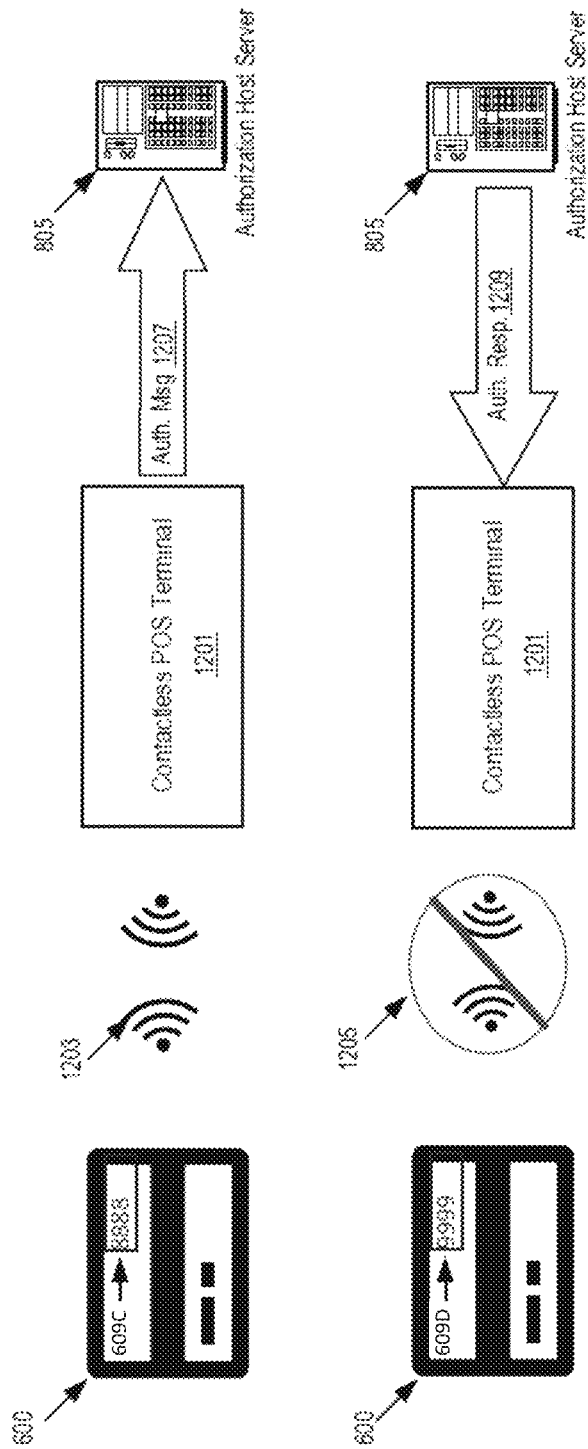

FIG. 12 is an example of a contactless interaction between the dynamic cellular card and a computing device, in accordance with one or more embodiments of the present disclosure. In some instances, the dynamic cellular card 600 can be placed near a computing device, for example, contactless POS terminal 1201. The contactless POS terminal 1201 can emit electromagnetic waves or RFID signals 1203 received by the dynamic cellular card 600. The dynamic cellular card 600 can use the electromagnetic waves to power up and send data to the contactless POS terminal 1201. As discussed above, examples of such data can include a permanent card identification number, a first temporary card identification number 609C, a user name, an expiration date, and/or other suitable data associated with the dynamic cellular card 600. The contactless POS terminal 1201 can use such data to send an authorization message 1207 to the authorization host server 805.

In some embodiments, the dynamic cellular card 600 can be powered up by the electromagnetic waves 1203. The dynamic cellular card 600 can retrieve from memory and decrypt an encrypted card identification number to produce a second temporary card identification number 609D while the dynamic cellular card 600 is powered up by the electromagnetic waves 1203. Additionally, the dynamic cellular card 600 can show the second temporary card identification number 609D on the display also while the dynamic cellular card 600 is powered up by the electromagnetic waves 1203. In some instances, the contactless POS terminal 1201 can receive an authorization response 1209 from the authorization server 805 approving the contactless interaction. It is noted that the second temporary card identification number 609D can remain shown on the display after the electromagnetic waves 1203 are discontinued.

Figure 13:
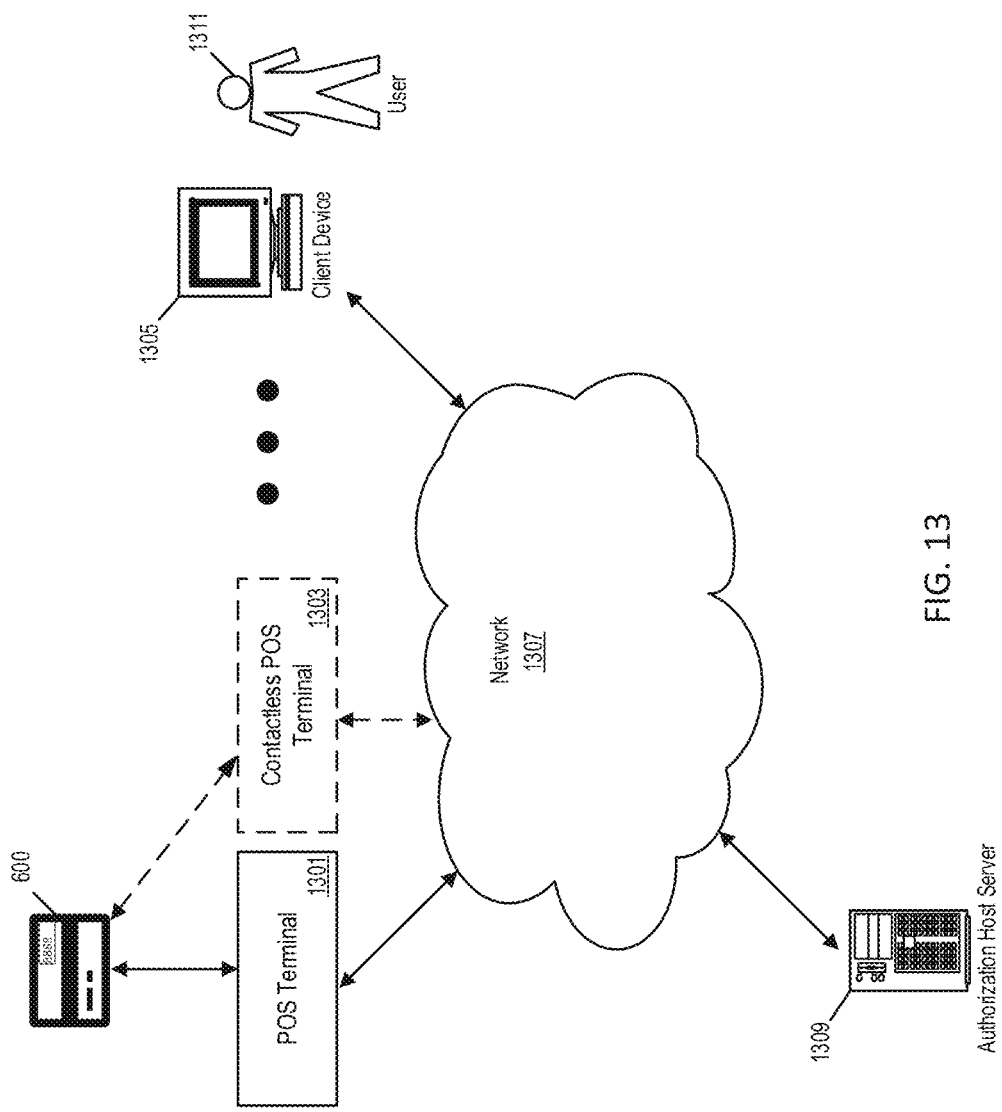

FIG. 13 depicts a block diagram of an example of a computer-based system 1300, in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the computing devices and/or the computing components of the computer-based system 1300 may be configured to manage large numbers of members and/or concurrent transactions or electronic activities, as detailed herein. In some embodiments, the computer-based system 1300 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 13, members POS terminal 1301, contactless POS terminal 1303, and client device 1305 (e.g., clients) of the computer-based system 1300 may include virtually any computing device capable of receiving and sending a message over a network (e.g., cloud network), such as network 1307, to and from another computing device, such as server 1309, and the like. In some embodiments, the dynamic cellular card 600 can interact with the POS terminal 1301 and the contactless POS terminal 1303 as discussed above. In some instances, a user 1311 in communication with client device 1305 can use the dynamic cellular card 600 to execute e-commerce transactions using data associated and/or stored in the dynamic cellular card 600. In some embodiments, server 1309 can be part of a financial institution system, merchant system, online store system, or other suitable entity capable of authenticate and authorize interactions or transactions associated with the dynamic cellular card 600. In some embodiments, the member devices 1301, 1303, and 1305 may be personal computers, multiprocessor systems, microprocessor-based or programmable consumer electronics, network PCs, and the like. In some embodiments, one or more member devices within member devices 1301, 1303, and 1305 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 1301, 1303, and 1305 may be devices that are capable of connecting using a wired or wireless communication medium such as, wearable computer, a laptop, tablet, desktop computer, a netbook, a video game device, a pager, a smart phone, an ultra-mobile personal computer (UMPC), and/or any other device that is equipped to communicate over a wired and/or wireless communication medium. In some embodiments, one or more member devices within member devices 1301, 1303, and 1305 may run one or more applications, such as Internet browsers, mobile applications, voice calls, video games, videoconferencing, and email, among others. In some embodiments, one or more member devices within member devices 1301, 1303, and 1305 may be configured to receive and to send web pages, and the like.

In some embodiments, a browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 1301, 1303, and 1305 may be specifically programmed by either Java, .Net, QT, C, C++ and/or other suitable programming language. In some embodiments, one or more member devices within member devices 1301, 1303, and 1305 may be specifically programmed to include or execute an application to perform a variety of possible tasks, such as, without limitation, messaging functionality, browsing, searching, playing, streaming or displaying various forms of content, including locally stored or uploaded messages, images and/or video.

In some embodiments, the network 1307 may provide network access, data transport and/or other services to any computing device coupled to it. In some embodiments, the network 1307 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the network 1307 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 1307 may include and implement, as an alternative or in conjunction with one or more of the above, a WiMAX architecture defined by the WiMAX forum. In some embodiments and, optionally, in combination of any embodiment described above or below, the network 1307 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the network 1307 may be transmitted based at least in part on one of more communication modes such as but not limited to: Near-Field Communication (NFC), Radio Frequency Identification (RFID), Narrow Band Internet of Things (NBIOT), ZigBee, 3G, 4G, 5G, Global System for Mobile Communications (GSM), General Packet Radio Service (GPRS), WiFi, WiMax, Code Division Multi-access (CDMA), and any combination thereof. In some embodiments, the network 1007 may also include mass storage, such as Network Attached Storage (NAS), a Storage Area Network (SAN), a Content Delivery Network (CDN) or other forms of computer or machine-readable media.

In some embodiments, the server 1309 may be, for example, a web server (or a series of servers) running a network operating system. In some embodiments, the server 1309 may be used for and/or provide cloud and/or network computing. Although not shown in FIG. 13, in some embodiments, the server 1309 may have connections to external systems like email, SMS messaging, text messaging, ad content providers, etc.

In some embodiments, the server 1309 may be specifically programmed to perform, in non-limiting example, as authentication servers, search servers, email servers, social networking services servers, financial/banking-related services servers, travel services servers, or any similarly suitable service-base servers for users of the member computing devices 1301, 1303, and 1305.

In some embodiments and, optionally, in combination of any embodiment described above or below, for example, one or more computing member devices 1301, 1303, and 1305, the server 1309, may include a specifically programmed software module that may be configured to send, process, and receive information using a scripting language, a remote procedure call, an email, a tweet, Short Message Service (SMS), Multimedia Message Service (MMS), Instant Messaging (IM), Internet Relay Chat (IRC), mIRC, Jabber, an application programming interface, Simple Object Access Protocol (SOAP) methods, Common Object Request Broker Architecture (CORBA), Hypertext Transfer Protocol (HTTP), Representational State Transfer (REST), or any combination thereof.

Figure 14:
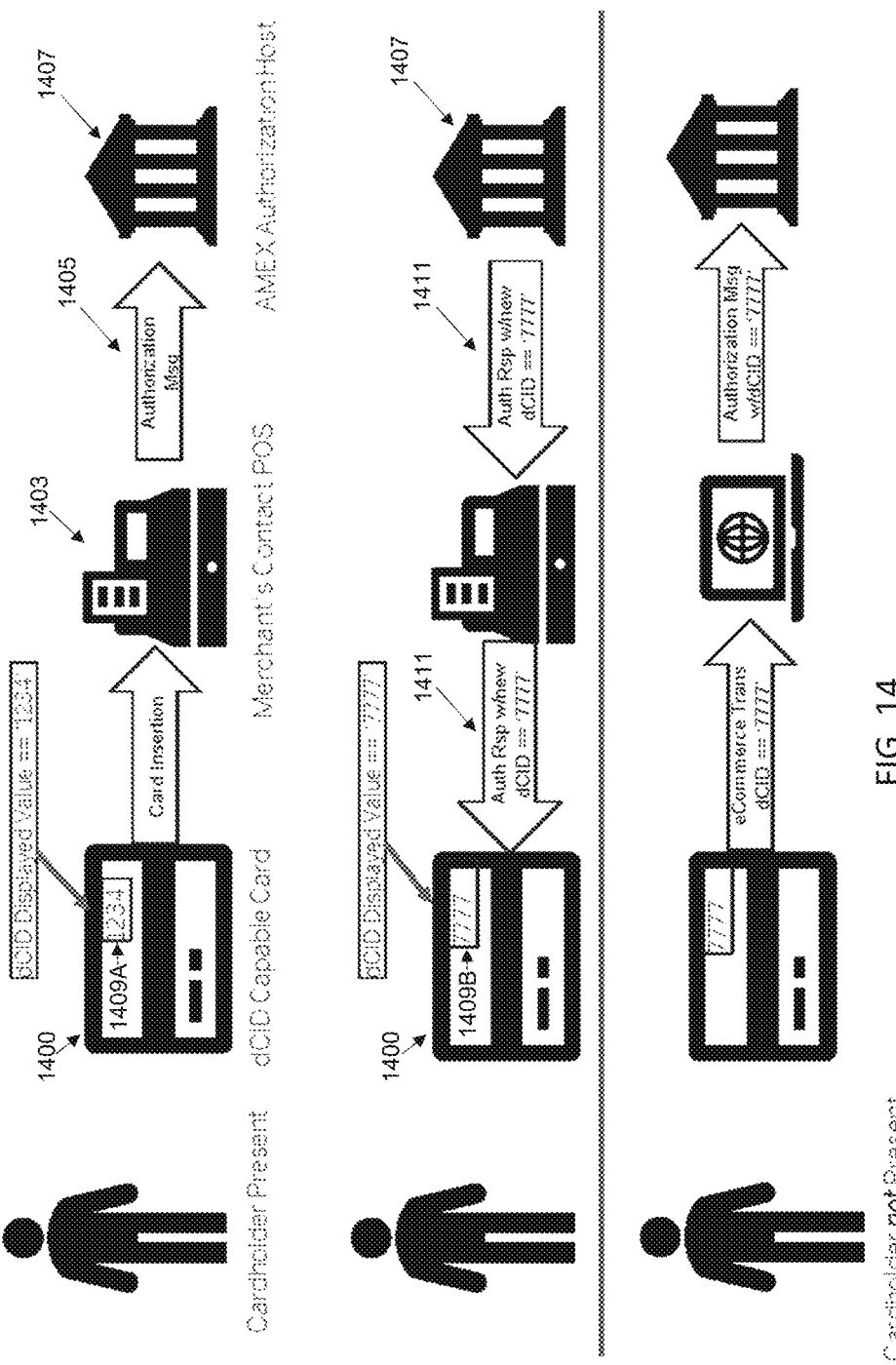

FIG. 14 is an example of interactions between a dynamic cellular card and a computing device, in accordance with one or more embodiments of the present disclosure.

Typically, a static 4-digit CID value that printed on a payment card is entered by a user or cardholder and sent online to an authorization host as proof that the user has the physical card. When this value is compromised, a third party seeking to perpetrate fraud only needs this value and other visible card data to complete an online transaction.

In some embodiments, a payment card with an electronic display can obtain a newly generated dCID value from a host and can display this new (dynamic) CID value on the card thus reducing the vulnerability of online fraud associated with the account associated with that card.

Initially, a host can generate the 4-digit dCID (normally printed on the face of the card) and passes this value on to a personalization bureau. The personalization bureau downloads this value to the payment application on the card. The payment application sends this value to the card's display as the initial dCID value for use in "card-not-present" transactions.

When the card is compromised and a contact authorization transaction is submitted, the host will generate issuer scripts and embed a new encrypted dCID value for the card to display. The payment card will receive the new encrypted dCID value in the issuer scripts and will decrypt the new dCID and send it to the card's electronic display. This new value may now be used a user to perform transactions where a card is not physically present such as online transactions.

For example, as shown in FIG. 14, in some instances, a dynamic cellular card can be associated with a first temporary identification card number 1409A. The card 1400 can be inserted into a computing device, for example, POS terminal 1403. The POS terminal 1403 can send an authorization message 1405 to the authorization host server 1407. In some instances, the authorization host server 1407 can send an authorization response 1411 with a set of new encrypted identification card numbers. The card 1400 can receive the authorization response 1411 with the set of new encrypted identification card numbers. Thereafter, the card 1400 can select and decrypt an encrypted identification card number from the set of new encrypted identification card numbers to produce a second temporary identification card number. The second temporary identification card number 1409B can be rendered on the card 1400 and used in a subsequent interaction with a different computing device.

Typically, re-issuance of a card is required when account numbers associated with the card are compromised. Reissuing a card requires among other things, system account updates, sending a new request for a new card to a personalization bureau, generation of a new card, and shipping of the new card to a user. In some embodiments of the present disclosure, instead of physically issuing a new card, the numbers on the card can be re-programmed remotely and effectively replace the old account with a new card without having to create a new physical card. All or part of account data including numbers on a dynamic cellular card, including but not limited to, the primary account number ("PAN"), 4-digit CID, 3-digit card security code ("CSC"), and expiration date of the card, can be displayed on programmable electronic paper. Re-programming of the card may be performed by the authorization host following a contact transaction by the card at a certified POS terminal.

Figure 15:
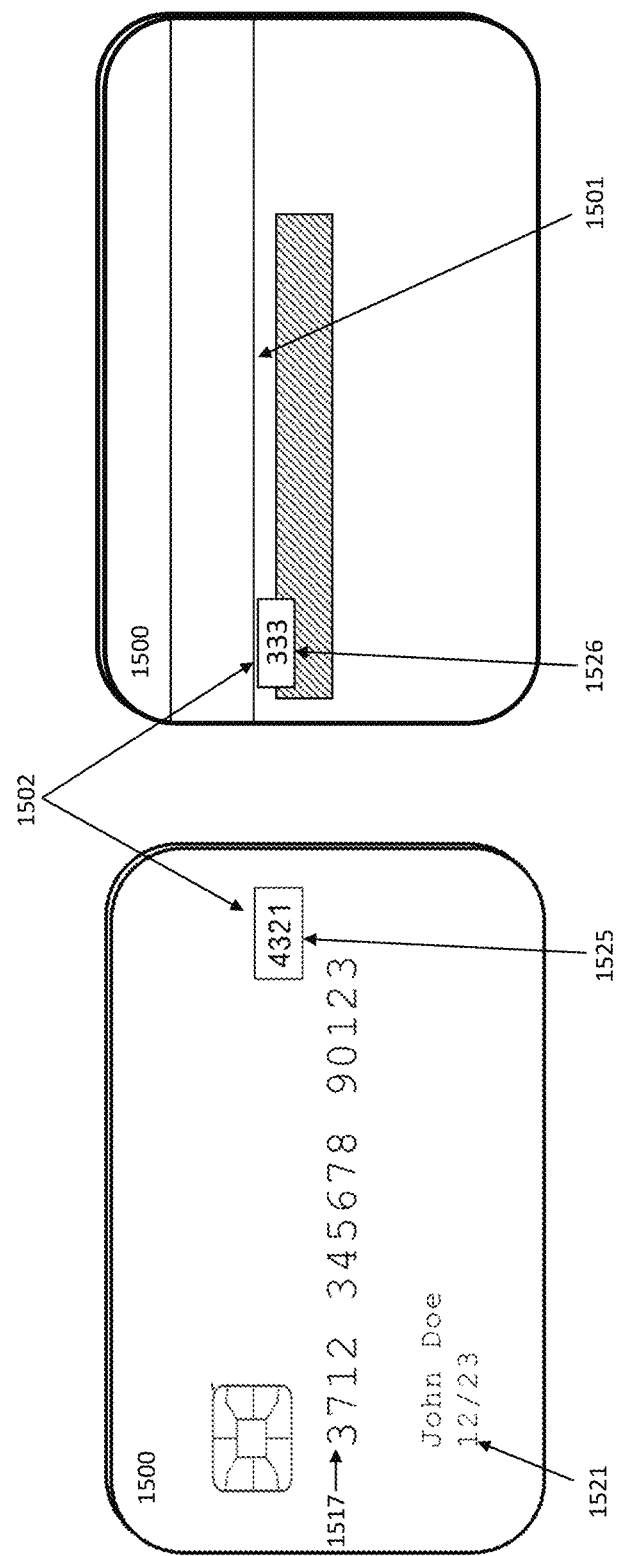

FIG. 15 is an example of interactions between a dynamic cellular card and a computing device, in accordance with one or more embodiments of the present disclosure.

In some instances, the dynamic cellular card can be associated with several first temporary card account numbers that are written on electronic programmable paper (e-paper) on the dynamic cellular card. For example, the expiration date on dynamic cellular card 1521 can be a first temporary account number. The primary account number ("PAN") 1517 can be another temporary account number. The 4-digit CID 1525 can also be a temporary account number. The 3-digit card security code ("CSC") 1526 on the back of the dynamic cellular card may also be a temporary account number. Initially, the expiration date of the dynamic cellular card, PAN, CID, and CSC values can be downloaded to a payment application on a chip on the dynamic cellular card and then displayed. Dynamic cellular card 1500 may contain a chip, but may not possess a magnetic stripe. Dynamic cellular card 1500 may or may not possess an internal battery source.

When the account is compromised, the cardholder can perform a contact transaction at a host certified POS, and in response, the host can generate and send encrypted new account data to the dynamic cellular card to populate the e-paper with the new values. The account data on the chip can also be reprogrammed in the same transaction.

Figure 16:
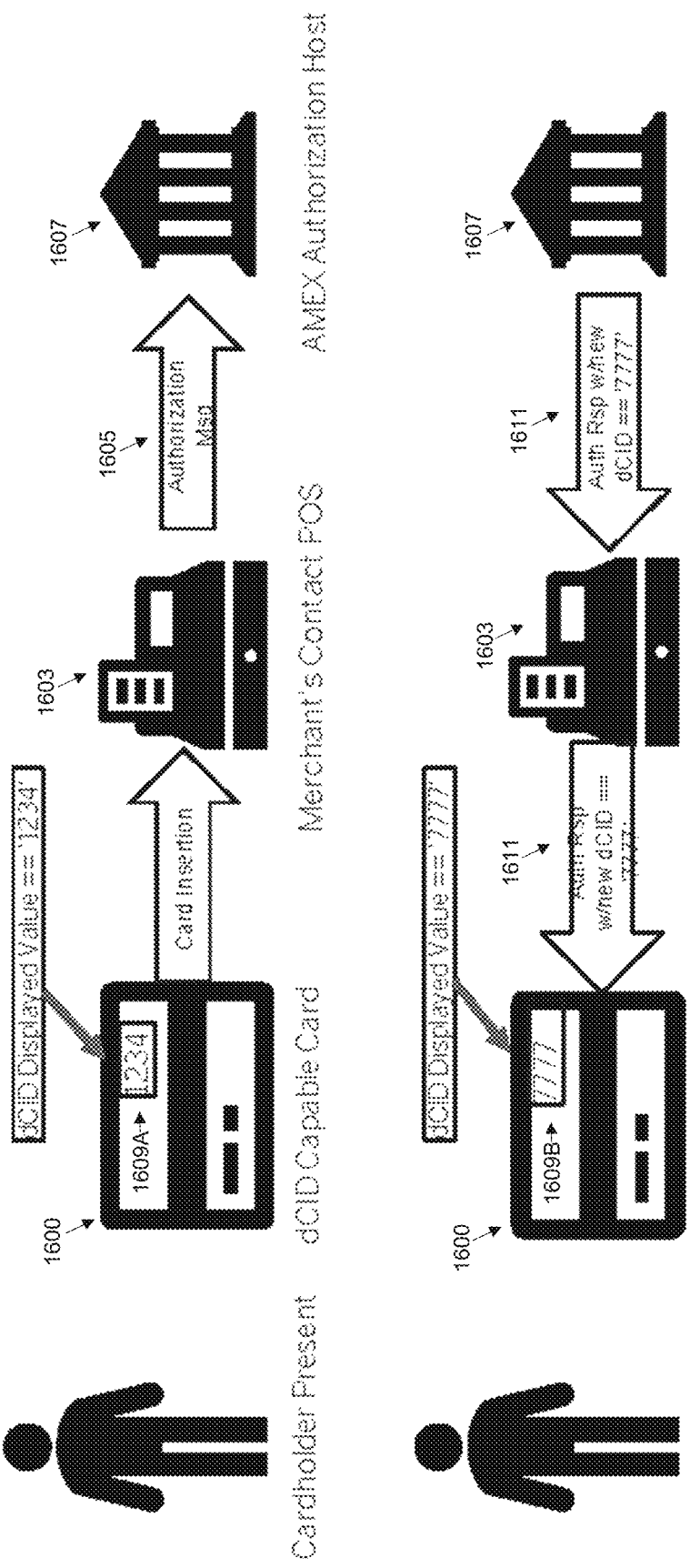

For example, as shown in FIG. 16, when the account is compromised, dynamic cellular card 1600 can be inserted into a computing device such as POS terminal 1603. POS terminal 1603 can send an authorization message 1605 to the authorization host server 1607. In some instances, the authorization host server 1607 can send an authorization response 1611 with a set of new encrypted card account numbers including a new 4-digit CID number 1609A. Other card account numbers that may be similarly transmitted include a new 3-digit CSC; a new expiration date for the dynamic cellular card; and a new PAN. Dynamic cellular card 1500 can receive the authorization response 1611 comprising the set of new encrypted dynamic cellular card account numbers including the new 4-digit CID number, the new 3-digit CSC; the new expiration date; and a new PAN. Thereafter, dynamic cellular card 1500 can select and decrypt the new dynamic cellular card account numbers from the set of new encrypted dynamic cellular card account numbers to produce second temporary dynamic cellular card account numbers. The second temporary dynamic cellular card account numbers can be rendered on dynamic cellular card 1500 and used in a subsequent interaction with a different computing device.

The advantages of this remote re-issuance dynamic cellular card include elimination of the need to physically reissue a card with a compromised account and elimination of the cost associated with such reissuance. Based on this remote re-issuance dynamic cellular card, cards may be reissued faster. Further, since dynamic cellular cards may be reprogrammed by an authorization host on demand, acquiring static card account data may lose value for bad actors interested in fraudulently acquiring and using such data and thereby reduce or prevent fraud.

FIGS. 17 through 22 illustrate systems and methods for a fingerprint-enabled cellular card. The following embodiments provide technical solutions and/or technical improvements that overcome technical problems, drawbacks and/or deficiencies in the technical field of fingerprint-enabled cellular cards. As explained in more detail, below, technical solutions and/or technical improvements herein include aspects of improved cards resilient to fraudulent use.

Figure 17:
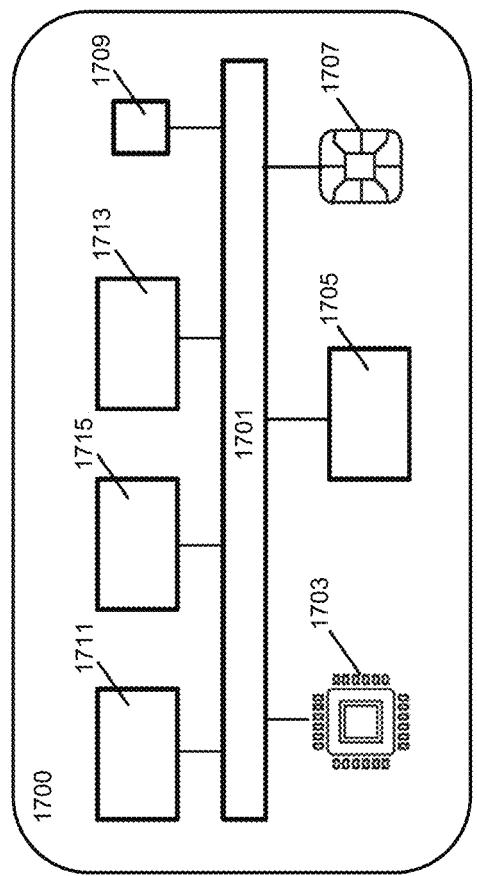

FIG. 17 illustrates an example of a fingerprint-enabled cellular card, in accordance with one or more embodiments of the present disclosure. In some embodiments, the fingerprint-enabled cellular card can include a communication bus 1701, a processor 1703, a visual indicator 1705, a smart card chip 1707, a fingerprint sensor 1709, a non-transitory memory 1711, a contactless antenna 1713, and a network communication interface 1715. In some embodiments, the visual indicator may be a display.

In some embodiments, the fingerprint-enabled cellular card is without an internal power source. By way of example, and in some embodiments, a method of using the fingerprint-enabled cellular card is to introduce the card to an external source of power. Once the card acquires power from the external source of power, a card holder may place a finger on fingerprint sensor 1709. The fingerprint sensor obtains and sends the fingerprint scan to the processor 1703 for processing that may include storing the fingerprint scan in non-transitory memory 1711 as a first fingerprint sample. The processor may also determine if the scan is a second fingerprint sample and determine if the second fingerprint sample is a match to the first fingerprint sample already stored in non-transitory memory 1711.

In some embodiments, communication bus 1701 may be a physical interface for interconnecting the various components of the card. However, in some embodiments, the communication bus 1701 may be a network interface, chipset buses, switch, or other communication interface.

In some embodiments, a fingerprint-enabled cellular card 1700 may include a fingerprint sensor 1709 configured to read, receive and send a card holder's fingerprint to the processor 1707.

In some embodiments, a fingerprint-enabled cellular card 1700 may include a processor 1707 operable to perform instructions when receiving power from an external source. For example, the external source for power may be a computing device not shown in FIG. 17. One set of instructions for the processor 1707 may be receiving and storing in non-transitory memory 1711 a fingerprint sample of a card holder obtained using fingerprint sensor 1709. In some embodiments, the fingerprint sensor 1709 can be a light-based optical sensor that take an optical image of a fingerprint sample and detects unique patterns on the surface of the fingerprint sample, such as ridges or unique marks, by analyzing lightest and darkest areas of the fingerprint sample. In some other embodiments, the fingerprint sensor 1709 can be a capacitive sensor that uses electricity to determine fingerprint patterns. As a finger rests on the surface of the fingerprint sensor 1709, the sensor measures a charge using ridges to exhibit a change in capacitance, while valleys on a fingerprint sample produce insignificant or no charge at all. A capacitive fingerprint sensor can use collected capacitance data to accurately detect fingerprints. In yet some other embodiments, the fingerprint sensor 1709 can be an ultrasonic sensor designed to emit ultrasonic pulses and measure how much such pulses bounces back when a fingerprint sample is placed on the surface of the sensor and accordingly detect a fingerprint sample.

In some embodiments, non-transitory memory 1711 may include any type of computer memory that retains data for an extended time, regardless of whether the fingerprint-enabled cellular card is powered on or off. For instance, the non-transitory memory can store a first fingerprint sample.

Figure 18:
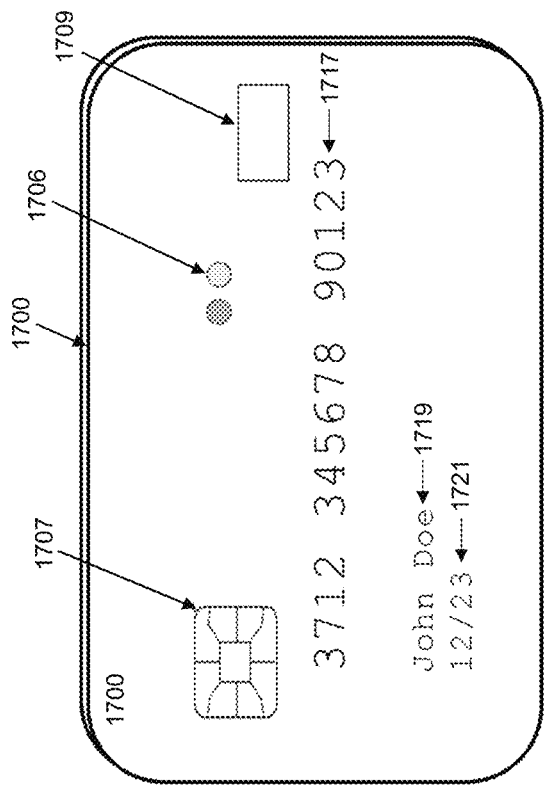

In some embodiments, a fingerprint-enabled cellular card 1700 may include light emitting diode or plural light-emitting diodes 1706 as seen in FIG. 18. The light-emitting diodes may be used instead of a visual indicator 1705. The light emitting diodes and/or the visual indicator may indicate a match of a second sample fingerprint to a first sample fingerprint. In some embodiments, a match can be determined based on a fingerprint analysis that can include plotting fingerprint sample points where fingerprint ridges end abruptly and fork into two branches. Likewise, orientation of fingerprint patterns such as, arches, loops, and whorls can be used in a matching process.

In some embodiments, if a first colored light, for example green, is displayed by the-light emitting diodes, the processor has determined that there was a match between a set of first and second sample fingerprints. However, if a second colored light, for example red, is displayed by the light emitting diode, the processor has determined that there was not a match between the set of first and second sample fingerprints.

In some embodiments, contactless antenna 1713 can include a Radio Frequency Identification (RFID) system, a Near Field Communication (NFC) system or other suitable system that enables the fingerprint-enabled cellular card 1700 to transmit data to other computing devices in a contactless interaction. In some implementations, the contactless antenna 1713 can receive electromagnetic waves (e.g., by radio frequency induction) from a computing device, and the electromagnetic waves can power up the fingerprint-enabled cellular card 1700. In some instances, the fingerprint-enabled cellular card 1700 can be powered up via the contactless antenna 1713 and thereafter, scan a second fingerprint sample and compare that sample to a first fingerprint sample stored in non-transitory memory 1711. The fingerprint-enabled cellular card 1700 can determine if there is a fingerprint match between a set of first and second sample fingerprints and display the results of a match or lack of a match with the visual indicator 1705. In some of embodiments, the processor's determination of a fingerprint match or not can be displayed by light emitting diodes 1706.

In some embodiments, the smart card chip 1707 can provide the fingerprint-enabled cellular card 1700 with electrical connectivity to an external power source when inserted into a computing device. In some instances, upon insertion into a computing device, the fingerprint-enabled cellular card 1700 sends and receives information from the computing device and/or a server in communication with the computing device. In some instances, the fingerprint-enabled cellular card can determine if there is a fingerprint match between a set of first and second sample fingerprints.

FIG. 18 schematically illustrates an example of the fingerprint-enabled cellular card 1700, in accordance with one or more embodiments of the present disclosure. In some implementations, the fingerprint-enabled cellular card may be a card that is associated with the card holder. In this example, permanent identification card number shown at 1717, the card holder's name shown at 1719, and expiration date shown at 1721 may all be a part of the fingerprint-enabled cellular card 1700.

Figure 19:
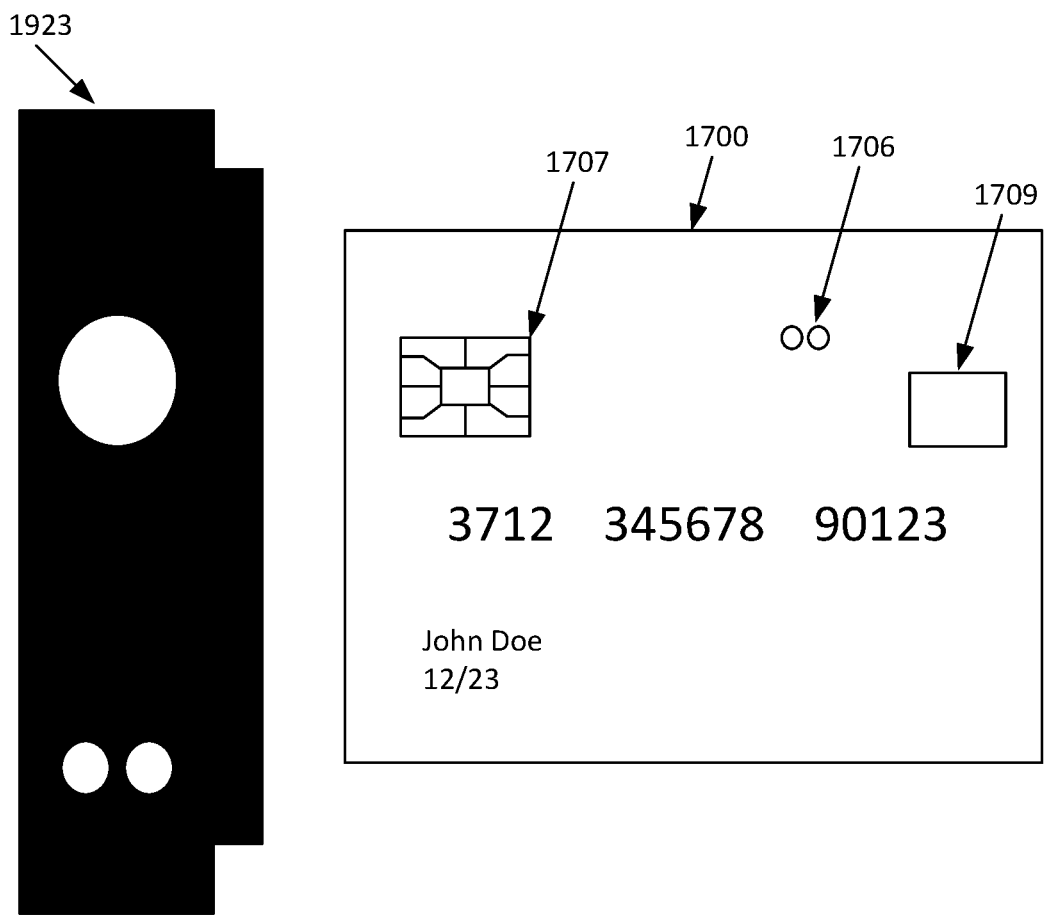

FIG. 19 illustrates an example of a card coupler 1923, in accordance with some embodiments of the present disclosure as further described below. In some implementations, card coupler 1923 initiates a first power transfer to a fingerprint-enabled cellular card 1900. After the power transfer, the processor may obtain a first fingerprint sample from the fingerprint sensor and send the sample to non-transitory memory 1711. In some instances, the fingerprint-enabled cellular card 1900 needs to be inserted into the card coupler 1923 to receive the power transfer. In some instances, the card holder will place a finger on the fingerprint sensor a plurality of times, such that the fingerprint-enabled cellular card may obtain a plurality of fingerprint data and images to build the first fingerprint sample.

Figure 20:
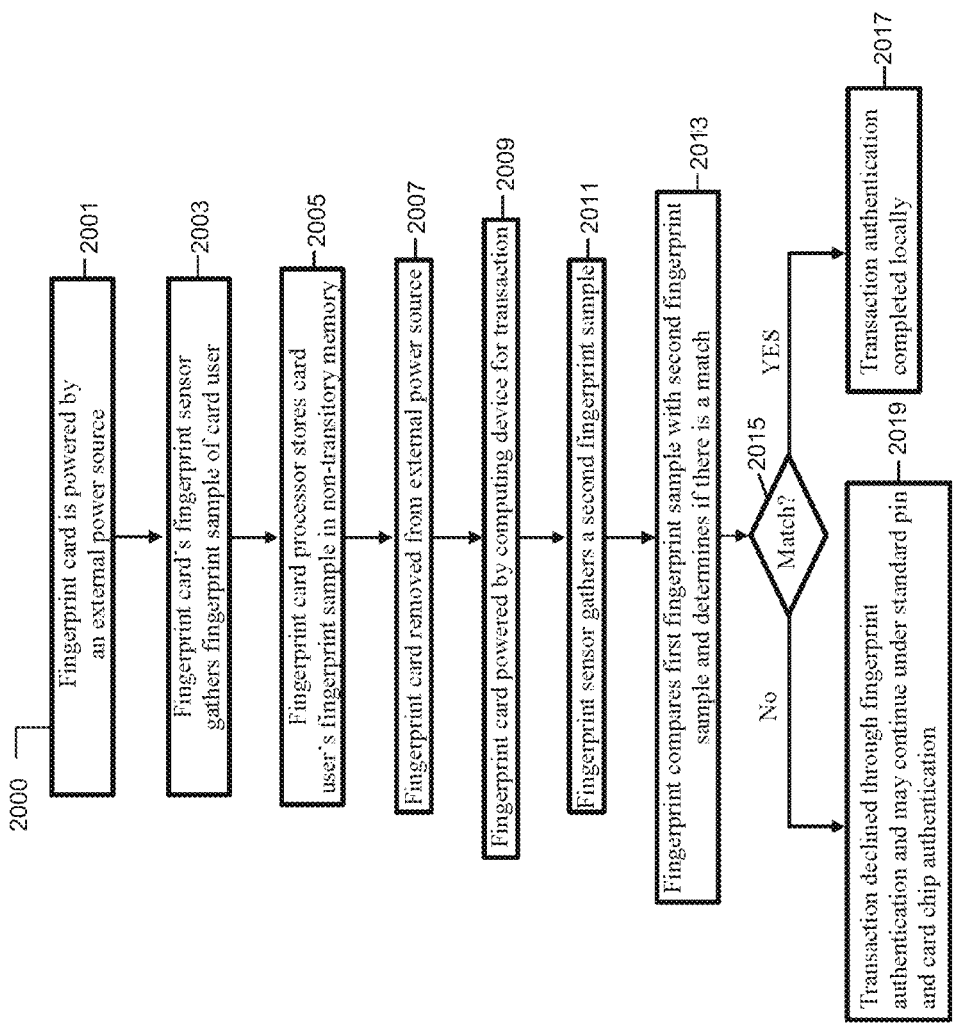

FIG. 20 illustrates an example of a flow diagram 2000 of an implementation of a fingerprint-enabled cellular card 1700, in accordance to some embodiments of the present disclosure. As shown in FIG. 20, at step 2001, the fingerprint-enabled cellular card is powered by an external power source for the first interaction. In some embodiments, the fingerprint sensor gathers fingerprint data and images of the card holder as shown in step 2003. In step 2005, the processor stores in non-transitory memory a first fingerprint sample obtained by the fingerprint sensor. The fingerprint-enabled cellular card is removed from external power source and ready to use for a future interaction, perhaps a transaction, as shown in step 2007. In step 2009, the fingerprint-enabled cellular card is powered by a computing device at a point of sale for a transaction. At the transaction, the card holder will place a finger on the finger sensor for the processor to gather a second fingerprint sample as shown in step 2011.

Continuing with the flow diagram 2000 of FIG. 20, as shown in step 2013, the processor compares the first fingerprint sample from the memory with the second fingerprint sample. In step 2015, the processor determines whether there is a match of the fingerprint samples. If there is a match, the processor of the fingerprint-enabled cellular card determines the transaction is authorized and may allow the transaction to proceed as shown in step 2017. If there is not a match of fingerprint samples, the processor of the fingerprint-enabled cellular card determines the transaction is not authorized and may disallow the transaction to proceed in step 2019. Optionally, if there was no fingerprint match, the processor of the fingerprint-enabled cellular card may start an authentication method of a standard pin with smart card chip 1707.

In some embodiments of the present disclosure, a first fingerprint sample of a card holder may be loaded in the non-transitory memory of the fingerprint-enabled cellular card before the card holder obtains the fingerprint-enabled cellular card. For example, computing device and non-transitory memory may have a first fingerprint of the card holder from an issuing institution and the issuing institution may load that fingerprint sample onto the non-transitory memory of the fingerprint-enabled cellular card before releasing the fingerprint-enabled cellular card to the card holder.

Figure 21:
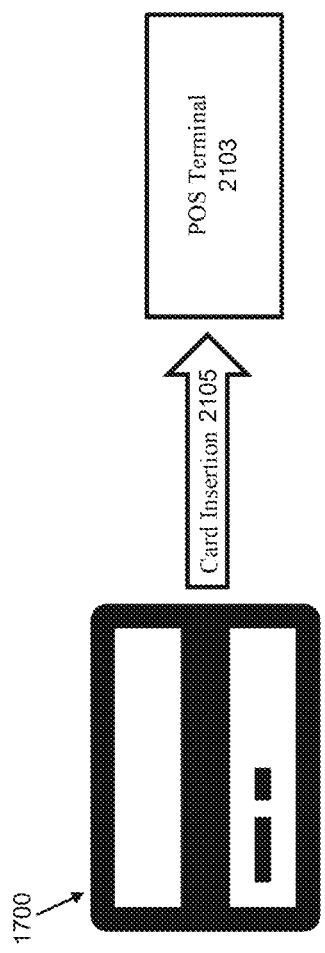

FIG. 21 is an example of interactions between the fingerprint-enabled cellular card and a computing device, in accordance with one or more embodiments of the present disclosure. The fingerprint-enabled cellular card 1700 can be inserted 2105 into a computing device, for example, POS terminal 2103. The POS terminal 2103 is operable to power up the fingerprint-enabled cellular card. The card holder places a finger on the finger sensor, allowing the fingerprint-enabled cellular card to determine if the second fingerprint sample is a match to the first fingerprint sample. If the processor of the fingerprint-enabled cellular card determines a fingerprint match, authentication is done and the fingerprint-enabled cellular card 1700 may communicate with POS terminal 2103 to allow the transaction. If the processor of the fingerprint-enabled cellular card determines there is no fingerprint match, authentication is not done and the processor of the fingerprint-enabled cellular card 1700 may communicate with POS terminal 2103 to disallow the transaction. In some embodiments, if the fingerprint samples are not a match, the processor of the fingerprint-enabled cellular card may communicate with the POS terminal to continue authentication with a standard pin and smart chip 107 authentication method to perhaps result in a different successful authentication process.

Figure 22:
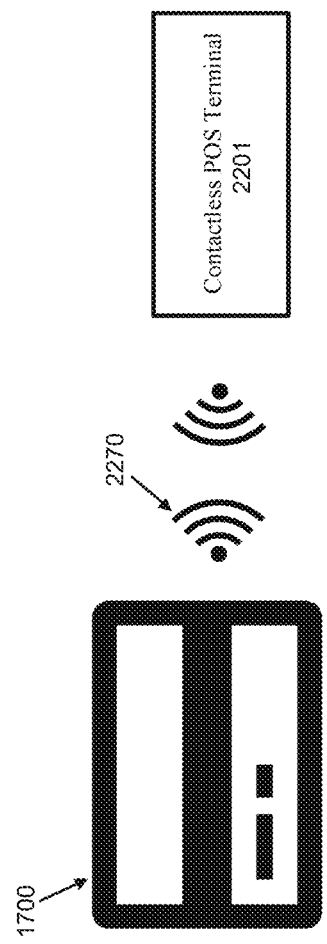

FIG. 22 is an example of a contactless interaction between the fingerprint-enabled cellular card and a computing device, in accordance with one or more embodiments of the present disclosure. In some instances, the fingerprint-enabled cellular card 1700 can be placed near a computing device, for example, contactless POS terminal 2201. The contactless POS terminal 2201 can emit electromagnetic waves or RFID signals 2207 received by the fingerprint-enabled cellular card 1700.

The fingerprint-enabled cellular card 1700 may use the electromagnetic waves to power up and the card holder may place a finger on the finger sensor so the processor of the fingerprint-enabled cellular card can determine if this second fingerprint sample is a match to the first fingerprint sample. If the processor determines a fingerprint match, authentication is done and processor 1703 of the fingerprint-enabled cellular card 1700 may communicate with contactless POS terminal 2201 to allow the transaction. In some embodiments, an authentication process can be a process that includes detecting a match between a first fingerprint sample stored in the non-transient memory and a second fingerprint sample taken from the surface of the fingerprint sensor 1709. If the processor of the fingerprint-enabled cellular card determines there is no fingerprint match, authentication is not done and the processor of the fingerprint-enabled cellular card may communicate with contactless POS terminal 2201 to disallow the transaction. In some embodiments, if the fingerprints are not a match, the fingerprint-enabled cellular card may communicate with the contactless POS terminal to continue with a standard pin and smart chip 1707 authentication.

In some embodiments, the fingerprint-enabled cellular card 1700 comprises a processor 1703; a fingerprint sensor 1709; a light-emitting diode 1706; and a non-transitory memory 1711 and storing instructions. The storing instructions when executed by the processor, cause the processor to power up the fingerprint-enabled cellular card upon receiving power from an external power source housed within a computing device during at least one interaction between the fingerprint-enabled cellular card and the computing device. The fingerprint-enabled cellular card lacks an internal power source, and when the fingerprint-enabled cellular card is powered up, the processor is further configured to detect a first fingerprint sample via the fingerprint sensor. The first fingerprint sample is associated with a user of the fingerprint-enabled cellular card and the processor initiates an authentication process of the first fingerprint sample before a transaction event. The authentication process is based on a match between the first fingerprint sample stored in the non-transitory memory and a second fingerprint sample. The fingerprint-enabled cellular card emits a first light color via the light-emitting diode upon a determination that the first fingerprint sample matches the second fingerprint sample and allows the transaction event. The fingerprint-enabled cellular card emits a light of a second light color via the light-emitting diode upon a determination that the first fingerprint sample does not match the second fingerprint sample and disallows the transaction event.

In some embodiments, the fingerprint-enabled cellular card 1700 may be paired with a card holder's device (not shown), for example a smart phone. The pairing between the fingerprint-enabled cellular card 1700 and card holder's device may be accomplished with Bluetooth Low Energy (BLE) protocols. The card holder's device may have a mobile wallet application for example American Express mobile wallet. The fingerprint-enabled cellular card may be in constant communication with the card holder's device. For example, the fingerprint-enabled cellular card may 'ping" a mobile wallet app of the card holder's device. A card holder's device and the fingerprint-enabled cellular card may be operable to detect a location of the other.

In some embodiments, both the fingerprint-enabled cellular card and the card holder's device are operable to determine when the proximity to each other is greater than one specified distance. Optionally, if the fingerprint-enabled cellular card and the card holder's device are greater than the one specified distance, the fingerprint-enabled cellular card and/or the card holder's device may alert the card holder. In some embodiments, this alert can be done with LED lights or piezo speakers.

In some embodiments, when the proximity between the fingerprint-enabled cellular card and the card holder's device locations are such that they are no longer able to detect each other, the fingerprint-enabled cellular card and/or the card holder's device may be operable to deactivate the payment capabilities. Optionally, the card and/or the card holder's device may be operable to reactivate the payment capabilities when their proximity to each other are close enough to detect the other again.

Figure 23:
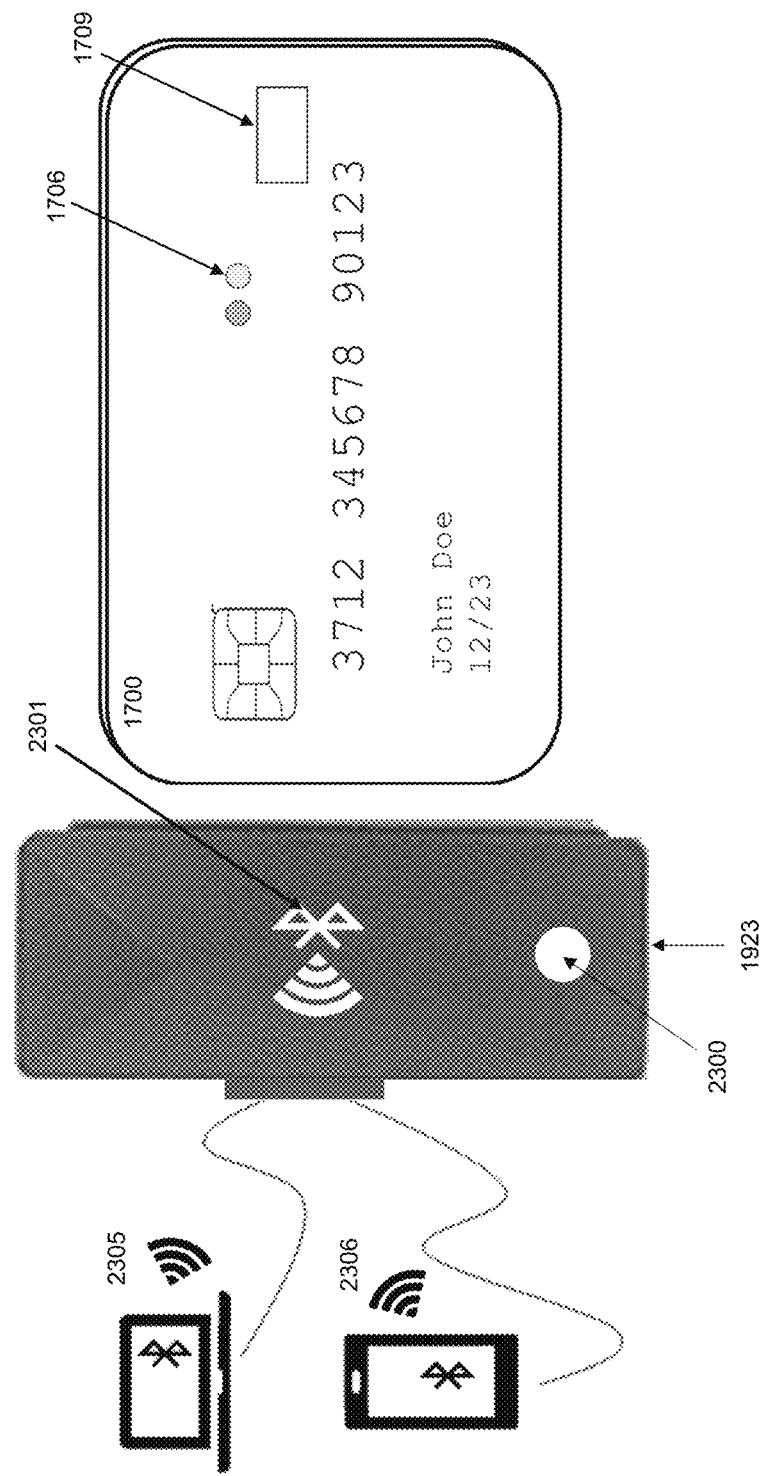

FIG. 23 illustrates systems and methods for a fingerprint-enabled cellular card with Blue Tooth Low Energy account registration, in accordance with one or more embodiments of the present disclosure. A fingerprint-enabled cellular card with Blue Tooth Low Energy account registration system can comprise a payment card with a fingerprint sensor, and Blue Tooth enabled card coupler.

As shown in FIG. 23, a card coupler 1923 and a fingerprint-enabled cellular card 1700 comprising a fingerprint sensor 1709 are provided to a user. Card coupler 1923 is equipped with an antenna such as a blue tooth antenna 2301 and may be battery powered or powered by an external source. For example, card coupler 1923 may be powered by computing device such as mobile phone or a PC and connected by a cable or by a coin cell type battery on the coupler. Card coupler 1923 may communicate with communication devices such as a mobile communication device or standalone computer based on Bluetooth capability. The card coupler can be reusable or can self-destruct making it a one-time use device.

Fingerprint-enabled cellular card 1700 is equipped with a fingerprint sensor 1709 and optionally a light emitting diode sensor 1706. An accompanying software application can provide instructions to a user on how a user can register the user's fingerprint on fingerprint sensor 1709 of fingerprint-enabled cellular card 1700.

As shown in FIG. 23, a user can insert fingerprint-enabled cellular card 1700 into card coupler 1923. The user places the user's finger on fingerprint sensor 1709 and presses their finger on the sensor at least one time until the proper finger-print template is created and stored on the fingerprint-enabled cellular card. The data template that describes the user's unique fingerprint never leaves the card. Instead, when the user initializes their fingerprint-enabled cellular card with their finger print, success or failure of the initialization can be transmitted to a software registration application on a computing device using Blue Tooth communication protocol. For example, card coupler 1923 communicates with an application on a mobile communication device or other communication device via Bluetooth 2301 and communicates whether the fingerprint has been successfully authenticated or not to the applet/website via BLE (Bluetooth Low Energy). The applet/website in turn can inform the host that the fingerprint-enabled cellular card is active and fingerprint capable.

An advantage of a fingerprint-enabled cellular card with Blue Tooth Low Energy account registration system is that it permits complete card activation and registration of a user's fingerprint to be completed in one secure step. In one transaction, an unactivated fingerprint-enabled cellular card can send its account data and its registration status to a web application before the fingerprint-enabled cellular card is activated.

Another advantage of a fingerprint-enabled cellular card with Blue Tooth Low Energy ("BLE") account registration system is that it allows biometric cardholder authorization at POS and in "card-not-present" transactions. A BLE registration method allows the user's fingerprint data to stay on the fingerprint-enabled card. The user's fingerprint data does not have to be pulled from another source (such as from a fingerprint template on a user's mobile phone). Further, a fingerprint-enabled cellular card can communicate with the authorization host network at the time of account setup permitting the possibility of other network to card communication in the privacy of a user's home.

Figure 24:
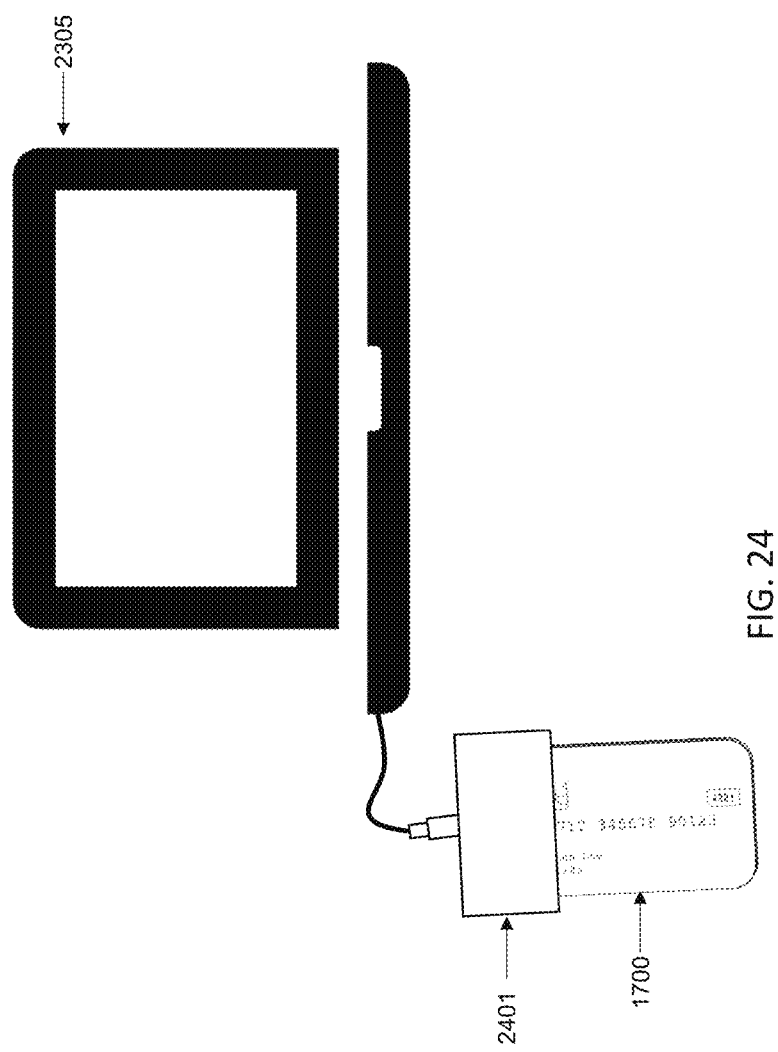

FIG. 24 illustrates systems and methods for an electronic-commerce coupler, in accordance with one or more embodiments of the present disclosure. As illustrated in FIG. 24, a coupler 2401 and a fingerprint-enabled cellular card 1700 are provided to a user. The coupler can be a low cost certified smart card reader. The coupler can be powered by a user's computing device or other power source. The coupler 2401 can be connected to the power source by a cable.

The coupler 2401 comprises software that communicates with a chip on fingerprint-enabled cellular card 1700. For example, the fingerprint-enabled cellular card 1700 may have an EMV certified kernel (EMV software that communicates with an EMV chip) which can be dedicated to perform a host contact transaction such that the fingerprint-enabled cellular card 1700 does not have to be present for a an authorization host message. The software application can either be a separate chip on the coupler or a program in the chip itself. The coupler 2401 can be certified to comply with various contact and contactless certifications such as EMV certifications and can also interface with a merchant payment application on a merchant website (mobile app).

When the fingerprint-enabled cellular card 1700 is inserted into the coupler 2401 or placed near the coupler 2401, the coupler communicates with the fingerprint-enabled cellular card and with a payment application on the merchant's website which in turn transmits an authorization message to the host. The host receives card data such as the one-time cryptogram, and cardholder verification results (such as offline PIN). The cardholder's fingerprint-enabled cellular card data may now be safely transmitted to the authorization host as though the Fingerprint-enabled cellular card is physically present at the merchant site.

Advantages of an electronic-commerce coupler system includes providing security of the in-store merchant POS to a user's computing device, and interfacing with the merchant's online store to greatly reduce fraud for online transactions. The software application that normally resides on the merchant's POS terminal may reside on the card itself and the transaction effectively becomes a "card present" transaction instead of "card not present" transaction. Transactions that use the e-commerce coupler can provide a user with ease of mind that the user's online payments are secured by EMV chip technology.

In accordance with one or more embodiments of the present disclosure, FIGS. 25-28 illustrate systems and methods for a dynamic fingerprint-enabled cellular card and a programmable dynamic CID.

A dynamic fingerprint-enabled cellular card with a fingerprint sensor and a programmable dynamic CID comprises at least a Fingerprint-enabled cellular card with a fingerprint sensor; a coupler with Bluetooth energy capabilities; a programmable digital CID; and a wallet or application on a computing device that allows a user to change the 4-digit CID (dCID) value on the user's fingerprint-enabled cellular card to a new value of the user's choice using bluetooth energy protocol.

Fingerprint authentication is required to change the dCID value. Fingerprint authentication may be obtained by any of the embodiments disclosed herein. The software application on the computing device can update the new dCID value. The dCID value may also be programmed to remain unchanged or changeable by authorization host.

By authenticating their fingerprint on their card, and through the use of blue tooth energy technologies in association with a coupler, a user can choose their own unique 4-digit CID value and can program/populate their own unique 4-digit CID value using a wallet/app via Bluetooth protocol.

Figure 25:
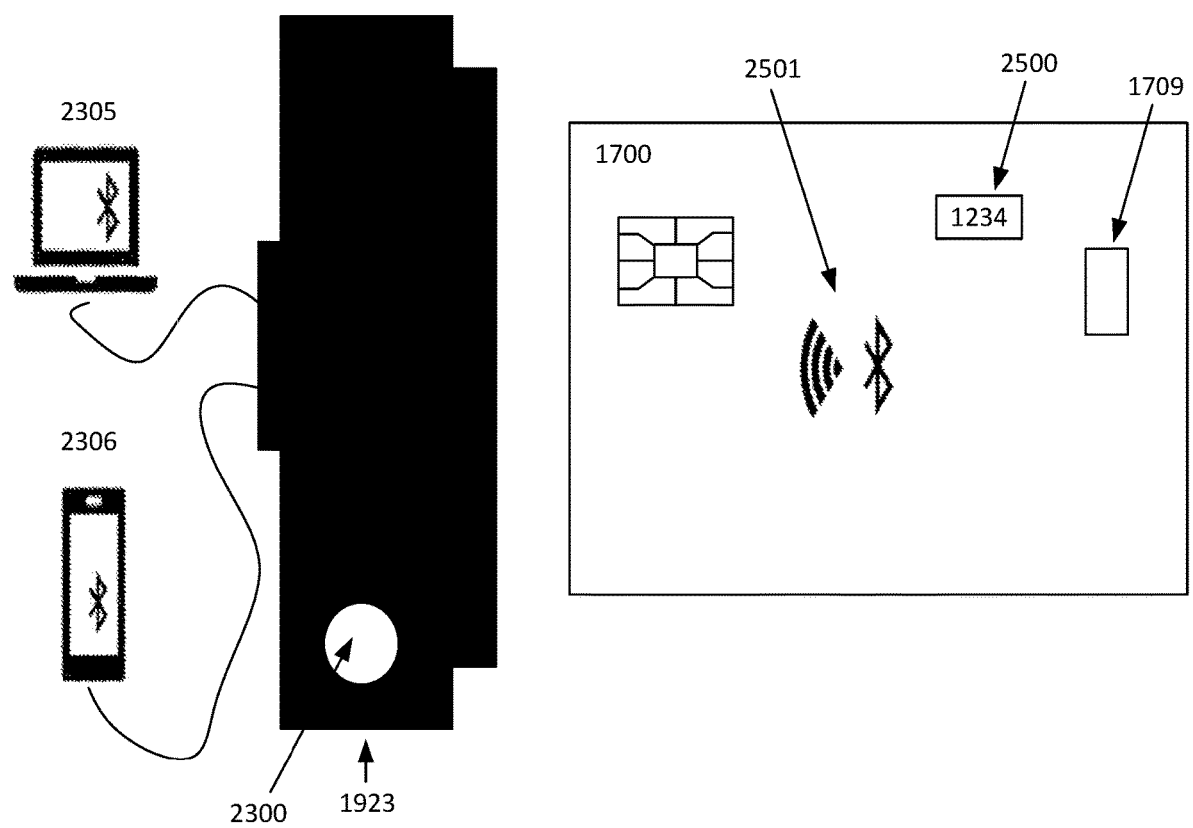

Fingerprint authentication may be obtained in several ways. For example, as shown in FIG. 25, a card coupler 1923 is provided to a user. Card coupler 1923 is equipped with an antenna such as a blue tooth antenna 2501 and may be battery powered or powered by an external source. Card coupler 1923 may communicate with communication devices such as a mobile communication device or stand-alone computer based on Bluetooth capability.

Fingerprint-enabled cellular card 1700 is equipped with a fingerprint sensor 1709 and optionally a light emitting diode sensor 1706. A user can insert fingerprint-enabled cellular card 1700 into card coupler 1923. The user places their finger on fingerprint sensor 1709 at least one time. Card coupler 1923 communicates with an application on a mobile communication device or other communication device via Bluetooth and indicates whether the fingerprint has been successfully authenticated or not.

Figure 26:
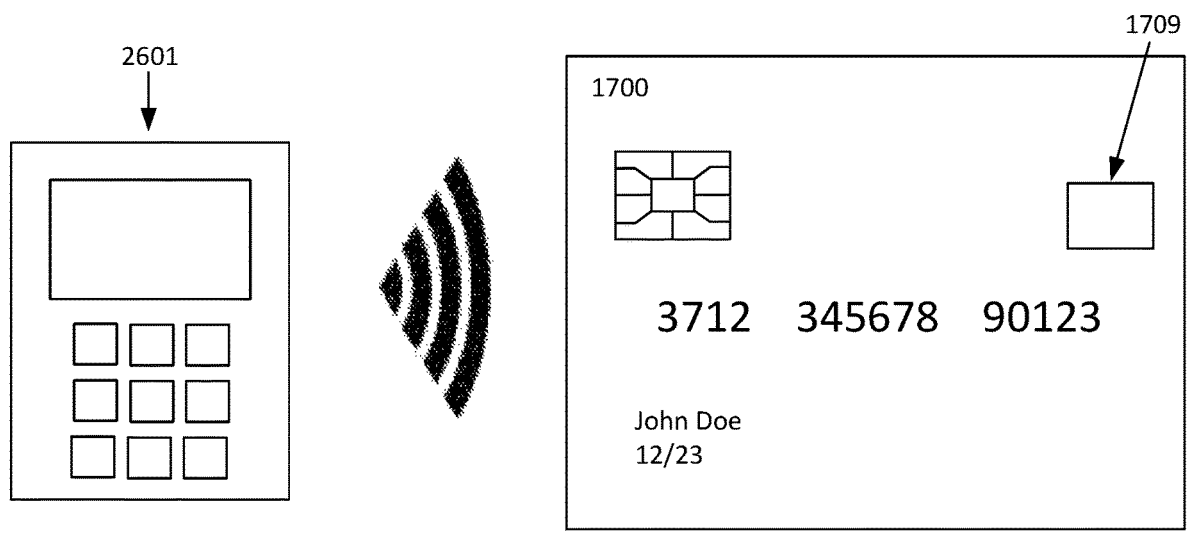

Alternatively, as shown in FIG. 26, a user presents fingerprint-enabled cellular card 1700 to POS terminal 2601 with their finger on fingerprint sensor 1709. The RF field from POS terminal 2601 provides power to fingerprint-enabled cellular card 1700 or to fingerprint sensor 1709. Card 1700 authenticates fingerprint as described in embodiments described herein, illuminates a green LED, and informs POS terminal 2601 that the cardholder has been verified. When the cardholder is authenticated, the POS terminal 2601 or fingerprint-enabled cellular card 1700 completes the contactless transaction without further cardholder verification.

Figures 27, 28:
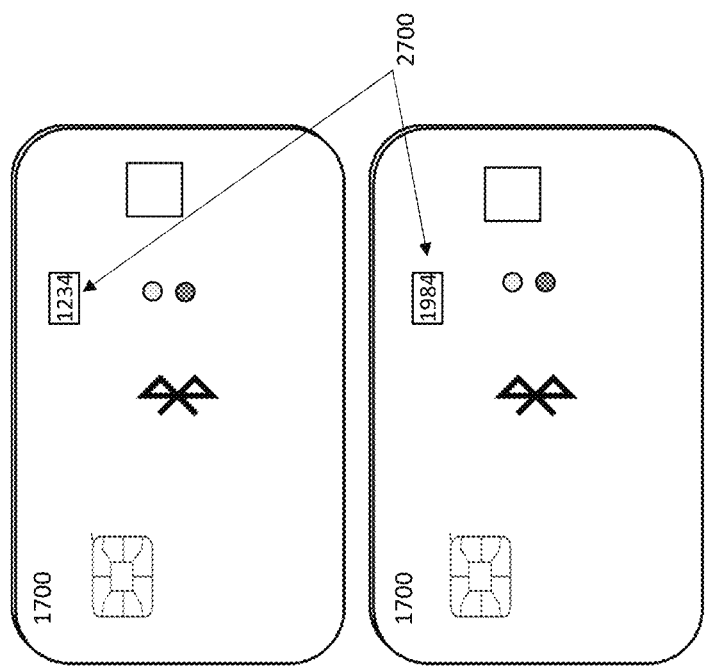

As shown in FIG. 27, a dynamic 4-digit CID value can be initially obtained using similar processes as described in various embodiments described herein. As shown in FIG. 28, using wallet/software application via Blue Tooth protocol on a computing device, a user can change the dCID value on fingerprint-enabled cellular card 1700 after providing fingerprint authentication. For example, a user can press their finger on card 1700 to authenticate their fingerprint. Once the fingerprint is authenticated, a software application on mobile device allows the user to change the dCID to the value of their choice via BLE protocol. The software application updates the new value. As discussed above, the dCID may be programmed to remain unchanged or be dynamic (changeable by host).

An advantage of a Blue Tooth enabled, dynamic fingerprint-enabled cellular card with a fingerprint sensor and a programmable dynamic CID is that a user can obtain additional ownership and personalization of the user's dynamic fingerprint-enabled cellular card by choosing their own 4-digit CID value that is easy to memorize and thus enter quickly into "card-not-present" transactions.

Figure 29:
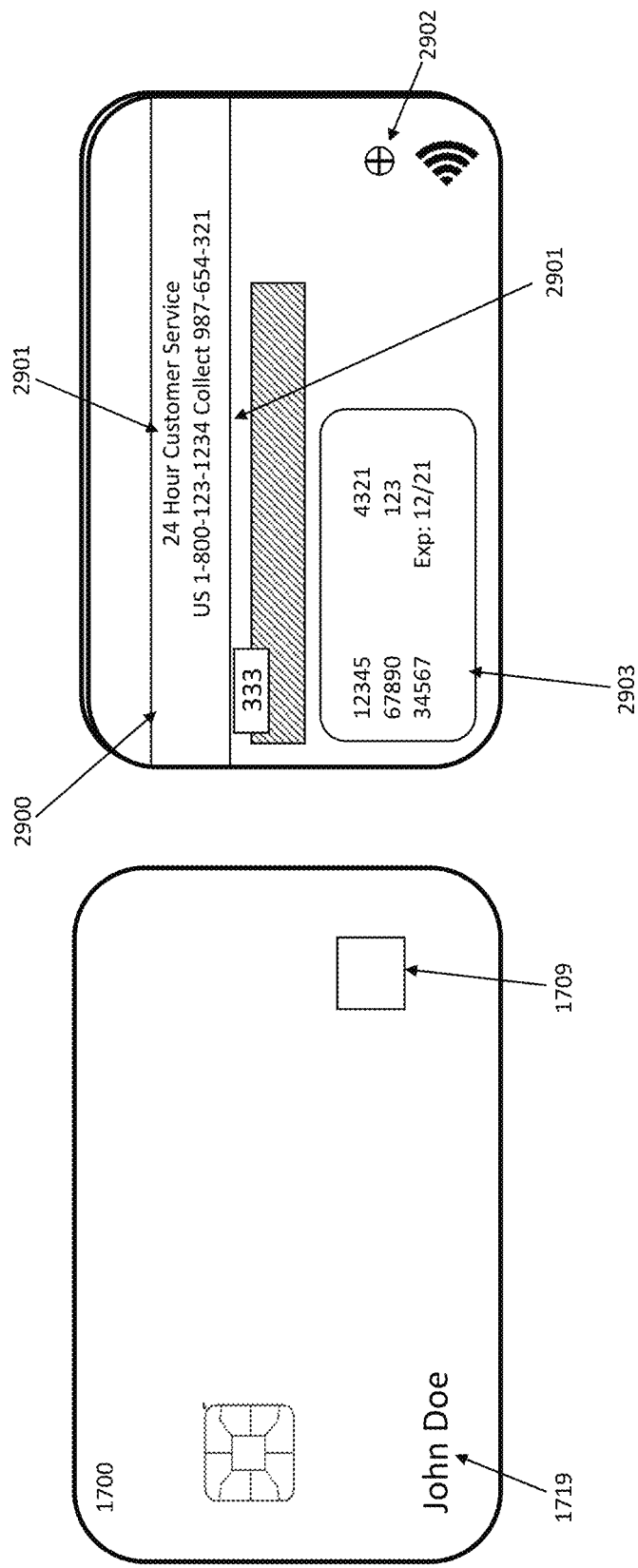

FIG. 29 illustrates apparatus and methods for a fingerprint-enabled digital display cellular card, in accordance with one or more embodiments of the present disclosure.

Typically, a payment card can have sensitive account data statically printed or embossed on the card. Such sensitive account data may include but is not limited to: the primary account number ("PAN") for the card; the expiration date of the card; the 4-digit card security code ("CSC"); and a 3-digit card security code, among others. In some embodiments, the present disclosure can display sensitive account data on a digital display on the card. The digital display can comprise an electro-chromatic display. The digital display can be illuminated and visible only when a user places the user's fingerprint on a fingerprint sensor on the card and the user's fingerprint has been authenticated.

As shown in FIG. 29, fingerprint-enabled digital display cellular card 1700 has a fingerprint sensor 1709. Fingerprint-enabled digital display cellular card 1700 can be powered by a thin rechargeable battery 2902. A user can place the user's finger on the fingerprint sensor 2909 on card 2900 at least once for user authentication as described in various embodiments disclosed herein. When the user's fingerprint is authenticated, a digital display 2903 on fingerprint-enabled digital display cellular card 1700 is powered up and displays account sensitive data including the PAN, the expiration date of the card, the 4-digit card CID, or the 3-digit CSC on the digital display.

An advantage of a digital display card is that it is programmable from the field and allows re-issuance. The Fingerprint-enabled digital display cellular card can be programmable from a remote location. In some embodiments, the magnetic stripe on the back of a card may be programmable remotely using programmable electronic paper. The fingerprint-enabled digital display cellular card may be fully re-programmable card or can be completely terminated remotely.

Any regional information on the card including region-specific "help" data, such as regional contact information including telephone numbers for customer service can also be programmed remotely thus making the card region-agnostic. A card that uses a digital display according to the present embodiment can be fully programmable, completely erasable, and completely re-issuable by a remote host. Further, a fingerprint-enabled digital display cellular card can use a multi-operational system and can be region agnostic.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As used herein, the term "user" shall refer to at least one user. In some embodiments, the term "user" should be understood to refer to a provider of an application or applications as described herein and/or a consumer of data supplied by a data provider. By way of example, and not limitation, the terms "user" or "developer" can refer to a person who receives data provided by the data or service provider over the Internet in a browser session, or can refer to an automated software application which receives the data and stores or processes the data.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" or "near real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process. In some embodiments, events and/or actions in accordance with the present disclosure can be in real-time, near real-time, and/or based on a predetermined periodicity of at least one of: nanosecond, several nanoseconds, millisecond, several milliseconds, second, several seconds, minute, several minutes, hourly, several hours, daily, several days, weekly, monthly, etc. As used herein, the term "dynamically" and term "automatically," and their logical and/or linguistic relatives and/or derivatives, mean that certain events and/or actions can be triggered and/or occur without any human intervention.

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices, and others. In some embodiments, the non-transitory machine-readable medium can include one or more storage devices, and memory devices described above.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or Central Processing Unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers can be, for example, a collection of servers serving one or more functions of a single server.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6)

VMWare, (7) Android, (8) Java Platforms, (9) Open Web Platform, (10) Kubernetes or other suitable computer platforms.

In some embodiments, computer-based systems of the present disclosure may be configured to utilize hardwired circuitry and/or hardware components that may be used in place of or in combination with software instructions to implement features consistent with principles of the disclosure. Thus, implementations consistent with principles of the disclosure are not limited to any specific combination of hardware circuitry or hardware components and/or software In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

The aforementioned examples are, of course, illustrative and not restrictive.

At least some aspects of the present disclosure will now be described with reference to the following numbered clauses.

1. A cellular card comprising:
   a processor;
   at least one antenna;
   a non-transitory memory storing instructions which, when executed by the processor, cause the processor to power up the cellular card upon receiving a power from an external power source housed within a computing device;
   wherein the cellular card lacks an internal power source; and
   wherein, when the cellular card is powered up, the processor is further configured to:
      establish, via the at least one antenna, a wireless communication with at least one cellular network tower associated with a mobile network carrier during at least one interaction between the card and the computing device;
      provide, with the wireless communication, card identifying data to the mobile network carrier to register the card with a user mobile account;
      receive, from the mobile network carrier, user mobile account data that comprises a user-associated private key;
      transmit the user mobile account data to a card issuing entity computing device to associate the user mobile account with a user card account based at least in part on the user-associated private key; and
      share the user mobile account data and user card account data between the mobile network carrier and a card issuing entity associated with the cellular card.

2. The cellular card of clause 1, wherein the card identifying data provided to the mobile network carrier comprises geo-location data identifying a physical location of the cellular card.

3. The cellular card of clause 2, wherein the geo-location data comprises Global Positioning System (GPS) data.

4. The cellular card of any clause of clauses 1-3, wherein the external power source is a first external power source, the computing device is a first computing device, and the cellular card utilizes a second external power source obtained from a second computing device during a transaction event between the cellular card and the second computing device.

5. The cellular card of clause 4, wherein the transaction event between the cellular card and the second computing device, is a contactless transaction event.

6. The cellular card of clause 4, wherein the transaction event is a purchase event and wherein the data comprises purchase data of the purchase event, identifying an amount and at least one purchased item.

7. The cellular card of any clause of clauses 1-6, wherein, when the cellular card is powered up, the processor is further configured to:
   establish, via the at least one cellular network tower, a second communication with the card issuing entity computing device to transmit the user mobile account data to the card issuing entity computing device.

8. The cellular card of any clause of clauses 1-7, wherein, when the card is powered up, the processor is further configured to:
   establish, via an electronic wallet application associated with the card issuing entity and executed on another mobile device, a second communication with the card issuing entity computing device to transmit the user mobile account data to the card issuing entity computing device.

9. The cellular card of any clause of clauses 1-8, wherein, when the cellular card is powered up, the processor is further configured to:
   establish, via the computing device, a second communication with the card issuing entity computing device to transmit the user mobile account data to the card issuing entity computing device.

10. The cellular card of any clause of clauses 1-9, wherein, the user mobile account data comprises geo-location data identifying a physical location of the cellular card.

11. A method comprising:
   powering up, by a processor, a cellular card upon receiving a power from an external power source housed within a computing device;
   wherein the cellular card lacks an internal power source; and
   wherein, when the cellular card is powered up:
      establishing via at least one antenna, a wireless communication with at least one cellular network tower associated with a mobile network carrier during at least one interaction between the cellular card and the computing device;
      providing with the wireless communication, card identifying data to the mobile network carrier to register the cellular card with a user mobile account;
      receiving from the mobile network carrier, user mobile account data that comprises a user-associated private key;
      transmitting the user mobile account data to a card issuing entity computing device to associate the user mobile account with a user card account based at least in part on the user-associated private key; and
      sharing the user mobile account data and user card account data between the mobile network carrier and a card issuing entity associated with the card.

12. The method of clause 11, wherein the card identifying data comprises geo-location data identifying a physical location of the cellular card.

13. The method of clause 12, wherein the geo-location data comprises Global Positioning System (GPS) data.

14. The method of any clause of clauses 11-13, wherein the external power source is a first external power source, the computing device is a first computing device, and the cellular card utilizes a second external power source obtained from a second computing device during a transaction event between the cellular card and the second computing device.

15. The method of clause 14, wherein the transaction event between the cellular card and the second computing device, is a contactless transaction event.

16. The method of clause 14, wherein the transaction event is a purchase event and wherein the user mobile account data comprises purchase data of the purchase event, identifying an amount and at least one purchased item.

17. The method of any clause of clauses 11-16, wherein, when the cellular card is powered up, the method further comprises:
establishing, by the processor, via the at least one cellular network tower, a second communication with the card issuing entity computing device to transmit the user mobile account data to the card issuing entity computing device.

18. The method of any clause of clauses 11-16, wherein, when the card is powered up, the method further comprises:
establishing, by the processor, an electronic wallet application associated with the card issuing entity and executed on another mobile device, a second communication with the card issuing entity computing device to transmit the user mobile account data to the card issuing entity computing device.

19. The method of any clause of clauses 11-18, wherein, when the cellular card is powered up, the method further comprises:
establishing, by the processor, via the computing device, a second communication with the card issuing entity computing device to transmit the user mobile account data to the card issuing entity computing device.

20. A non-transitory computer readable medium comprising code which, when executed by a processor, causes the processor to:
power up a cellular card upon receiving a power from an external power source housed within a computing device;
wherein the cellular card lacks an internal power source; and
wherein, when the cellular card is powered up, the processor is further configured to:
establish, via the at least one antenna, a wireless communication with at least one cellular network tower associated with a mobile network carrier during at least one interaction between the cellular card and the computing device;
provide, with the wireless communication, card identifying data to the mobile network carrier to register the card with a user mobile account;
receive, from the mobile network carrier, user mobile account data that comprises a user-associated private key;
transmit the user mobile account data to a card issuing entity computing device to associate the user mobile account with a user card account based at least in part on the user-associated private key; and
share the user mobile account data and user card account data between the mobile network carrier and a card issuing entity associated with the cellular card.

While one or more embodiments of the present disclosure have been described, it is understood that these embodiments are illustrative only, and not restrictive, and that many modifications may become apparent to those of ordinary skill in the art, including that various embodiments of the methodologies, the systems/platforms, and the devices described herein can be utilized in any combination with each other. Further still, the various steps may be carried out in any desired order (and any desired steps may be added and/or any desired steps may be eliminated).

The invention claimed is:

1. A cellular card comprising:
a processor;
at least one antenna;
a non-transitory memory storing instructions which, when executed by the processor, cause the processor to power up the cellular card upon receiving a power from an external power source housed within a computing device;
wherein the cellular card lacks an internal power source; and
wherein, when the cellular card is powered up, the processor is further configured to:
establish, via the at least one antenna, a wireless communication with at least one cellular network tower associated with a mobile network carrier during at least one interaction between the cellular card and the computing device;
provide, with the wireless communication, card identifying data to the mobile network carrier to register the card with a user mobile account;
receive, from the mobile network carrier, user mobile account data that comprises a user-associated private key;
transmit the user mobile account data to a card issuing entity computing device to associate the user mobile account with a user card account based at least in part on the user-associated private key;
share the user mobile account data and user card account data between the mobile network carrier and a card issuing entity associated with the cellular card; and
in response to initiating a transaction event with a point-of-sale (POS) terminal, transmit a notification indicating usage of the cellular card from the at least one antenna and via the at least one cellular network tower to the card issuing entity computing device or to the mobile network carrier to determine whether the transaction event is fraudulent.

2. The cellular card of claim 1, wherein the card identifying data provided to the mobile network carrier comprises geo-location data identifying a physical location of the card.

3. The cellular card of claim 2, wherein the geo-location data comprises Global Positioning System (GPS) data.

4. The cellular card of claim 1, wherein the external power source is a first external power source, the computing device is a first computing device, and the cellular card utilizes a second external power source obtained from the POS terminal during the transaction event between the cellular card and the POS terminal.

5. The cellular card of claim 4, wherein the transaction event between the cellular card and the POS terminal, is a contactless transaction event.

6. The cellular card of claim 4, wherein the transaction event is a purchase event and wherein the user mobile account data comprises purchase data of the purchase event, identifying an amount and at least one purchased item.

7. The cellular card of claim 1, wherein, when the cellular card is powered up, the processor is further configured to:
establish, via the at least one cellular network tower, a second communication with the card issuing entity computing device to transmit the user mobile account data to the card issuing entity computing device.

8. The cellular card of claim 1, wherein when the card is powered up, the processor is further configured to:
establish, via an electronic wallet application associated with the card issuing entity and executed on another mobile device, a second communication with the card issuing entity computing device to transmit the user mobile account data to the card issuing entity computing device.

9. The cellular card of claim 1, wherein, when the cellular card is powered up, the processor is further configured to:
establish, via the computing device, a communication with the card issuing entity computing device to transmit the user mobile account data to the card issuing entity computing device.

10. The cellular card of claim 7, wherein the user mobile account data comprises geo-location data identifying a physical location of the card.

11. A method comprising:
powering up, by a processor, a cellular card upon receiving a power charge from an external power source housed within a computing device;
wherein the cellular card lacks an internal power source; and
wherein, when the cellular card is powered up:
establishing via at least one antenna of the cellular card, a wireless communication with at least one cellular network tower associated with a mobile network carrier during at least one interaction between the cellular card and the computing device;
providing with the wireless communication, card identifying data to the mobile network carrier to register the cellular card with a user mobile account;
receiving from the mobile network carrier, user mobile account data that comprises a user-associated private key;
transmitting the user mobile account data to a card issuing entity computing device to associate the user mobile account with a user card account based at least in part on the user-associated private key;
sharing the user mobile account data and user card account data between the mobile network carrier and a card issuing entity associated with the cellular card; and
in response to initiating a transaction event with a point-of-sale (POS) terminal, transmitting a notification indicating usage of the cellular card from the at least one antenna of the cellular card and via the at least one cellular network tower to the card issuing entity computing device or to the mobile network carrier to determine whether the transaction event is fraudulent.

12. The method of claim 11, wherein the card-identifying data comprises geo-location data identifying a physical location of the card.

13. The method of claim 12, wherein the geo-location data comprises Global Positioning System (GPS) data.

14. The method of claim 11, wherein the external power source is a first external power source, the computing device is a first computing device, and the cellular card utilizes a second external power source obtained from the POS terminal during the transaction event between the cellular card and the POS terminal.

15. The method of claim 14, wherein the transaction event between the cellular card and the POS terminal, is a contactless transaction event.

16. The method of claim 14, wherein the transaction event is a purchase event and wherein the user mobile account data comprises purchase data of the purchase event, identifying an amount and at least one purchased item.

17. The method of claim 11, wherein, when the cellular card is powered up, the method further comprises:
establishing, by the processor, via the at least one cellular network tower, a second communication with the card issuing entity computing device to transmit the user mobile account data to the card issuing entity computing device.

18. The method of claim 11, wherein, when the cellular card is powered up, the method further comprises:
establishing, by the processor, an electronic wallet application associated with the card issuing entity and executed on another mobile device, a second communication with the card issuing entity computing device to transmit the user mobile account data to the card issuing entity computing device.

19. The method of claim 11, wherein, when the cellular card is powered up, the method further comprises:
establishing, by the processor, via the computing device, a second communication with the card issuing entity computing device to transmit the user mobile account data to the card issuing entity computing device.

20. A non-transitory computer readable medium comprising code which, when executed by a processor, causes the processor to:
power up a cellular card upon receiving a power from an external power source housed within a computing device;
wherein the cellular card lacks an internal power source; and
wherein, when the cellular card is powered up;
establish, via at least one antenna of the cellular card, a wireless communication with at least one cellular network tower associated with a mobile network carrier during at least one interaction between the cellular card and the computing device;
provide, with the wireless communication, card identifying data to the mobile network carrier to register the cellular card with a user mobile account;
receive, from the mobile network carrier, user mobile account data that comprises a user-associated private key;
transmit the user mobile account data to a card issuing entity computing device to associate the user mobile account with a user card account based at least in part on the user-associated private key;
share the user mobile account data and user card account data between the mobile network carrier and a card issuing entity associated with the cellular card; and
in response to initiating a transaction event with a point-of-sale (POS) terminal, transmit a notification indicating usage of the cellular card from the at least one antenna of the cellular card and via the at least one cellular network tower to the card issuing entity computing device or to the mobile network carrier to determine whether the transaction event is fraudulent.

\* \* \* \* \*